(12) United States Patent
Eliahou-Niv

(10) Patent No.: US 9,199,736 B2
(45) Date of Patent: Dec. 1, 2015

(54) SYSTEM, A METHOD AND A COMPUTER PROGRAM PRODUCT FOR REDUCING DAMAGE BY MISSILES

(75) Inventor: Shaul Eliahou-Niv, Kiriat-Ono (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 934 days.

(21) Appl. No.: 13/246,429

(22) Filed: Sep. 27, 2011

(65) Prior Publication Data

US 2012/0222545 A1 Sep. 6, 2012

(30) Foreign Application Priority Data

Mar. 2, 2011 (IL) .......................................... 211513

(51) Int. Cl.
*F41H 11/02* (2006.01)
*B64D 7/00* (2006.01)
*F41B 9/00* (2006.01)
*F41H 5/007* (2006.01)

(52) U.S. Cl.
CPC . *B64D 7/00* (2013.01); *F41B 9/005* (2013.01); *F41B 9/0075* (2013.01); *F41B 9/0081* (2013.01); *F41B 9/0087* (2013.01); *F41H 5/007* (2013.01); *F41H 11/02* (2013.01)

(58) Field of Classification Search
USPC ............ 89/36.01, 36.04, 36.07, 36.08, 36.09, 89/36.11, 36.12, 36.13; 244/121, 136
See application file for complete search history.

(56) References Cited

U.S. PATENT DOCUMENTS

| | | | |
|---|---|---|---|
| 4,955,546 A | 9/1990 | Liaw | |
| 5,018,317 A | 5/1991 | Kiyoshige et al. | |
| H1231 H * | 9/1993 | Richards | 356/5.03 |
| 5,400,688 A | 3/1995 | Eninger et al. | |
| 5,839,927 A | 11/1998 | Thomas et al. | |
| 6,119,574 A * | 9/2000 | Burky et al. | 169/47 |
| 6,244,156 B1 * | 6/2001 | Steuer et al. | 89/1.11 |
| 6,901,839 B2 * | 6/2005 | Edberg et al. | 89/36.17 |
| 6,955,107 B2 | 10/2005 | Alitalo et al. | |
| 7,008,305 B2 | 3/2006 | Sekiya | |
| 7,047,857 B2 | 5/2006 | Adkins | |
| 7,121,918 B2 | 10/2006 | Marti et al. | |
| 7,202,809 B1 * | 4/2007 | Schade et al. | 342/67 |
| 7,322,268 B1 * | 1/2008 | Wallin | 89/36.17 |
| 7,370,836 B2 * | 5/2008 | Greene | 244/195 |
| 7,387,060 B1 * | 6/2008 | Sanford | 89/1.11 |
| 7,411,543 B1 * | 8/2008 | Boka | 342/90 |
| 7,688,348 B2 | 3/2010 | Lubard et al. | |
| 7,803,204 B1 | 9/2010 | Mladinich | |

(Continued)

FOREIGN PATENT DOCUMENTS

WO  2006/034528 A1  4/2006

OTHER PUBLICATIONS

Erdem, et al., "Interaction of Two Parallel Rectangular Jets", ICAS 2002 Congress, pp. 1-7, (2002).

*Primary Examiner* — Benjamin P Lee
(74) *Attorney, Agent, or Firm* — Vorys, Sater, Seymour and Pease LLP

(57) ABSTRACT

Provided is a system for reducing damage by missiles to a vehicle, the system including: (a) a detector operable to detect a missile and to generate detection information indicative of a motion of the missile; (b) a processor, configured to analyze the detection information and to selectively trigger activation of a jetting system that is mounted on the vehicle in response to a result of the analysis; and (c) the jetting system, operable to jet a high pressure jet onto the missile.

60 Claims, 16 Drawing Sheets

(56) References Cited

U.S. PATENT DOCUMENTS

| | | | |
|---|---|---|---|
| 7,878,103 B2* | 2/2011 | Imholt et al. | 89/36.08 |
| 8,066,218 B2* | 11/2011 | Rubin | 244/1 TD |
| 8,490,538 B2* | 7/2013 | Tawil | 89/36.17 |
| 8,701,538 B2* | 4/2014 | Marscher et al. | 89/1.11 |
| 8,806,945 B2* | 8/2014 | Tillotson et al. | 73/599 |
| 8,863,666 B2* | 10/2014 | Tillotson et al. | 102/215 |
| 8,881,636 B2* | 11/2014 | Hyde et al. | 89/1.11 |
| 2005/0150371 A1* | 7/2005 | Rickard | 89/1.11 |
| 2007/0034072 A1* | 2/2007 | Greene | 89/1.11 |
| 2010/0288877 A1* | 11/2010 | Strabala | 244/1 TD |
| 2012/0216697 A1* | 8/2012 | Jacobsen et al. | 102/439 |
| 2013/0092016 A1* | 4/2013 | Sales | 89/36.08 |
| 2014/0020551 A1* | 1/2014 | Brill et al. | 89/36.02 |

* cited by examiner 1510 activating one or more systems operable to reducing damage to a vehicle by missiles 1511 arming one or more systems operable to reducing damage to a vehicle by missiles 1512 testing an operational state of one or more systems operable to reducing damage to a vehicle by missiles 1513 gaining control of vehicle resources of one or more other systems of the vehicle 1514 selectively preventing triggering of the activation of the jetting system in response to received location information that is indicative of a location of the vehicle

FIG. 4B 1590 jetting the high pressure jet onto the missile 1591 jetting onto the missile the high pressure jet that includes water from at least one jetting system container of water 1592 jetting onto the missile the high pressure jet that includes water from at least one jetting system container of water that is connected to a corresponding high pressure tank that contains high pressured gas 1593 blocking any gas transmission permitting connecting between each of the at least one jetting system container and its corresponding high pressure tank during the first period 1594 selectively opening any of the at least one gas transmission permitting connecting in response to a command 1595 blocking any hydraulically connecting between each of the at least one jetting system container and a fresh water supply of the vehcile prior to the jetting of the high pressure jet and during the jetting 1596 administering polymeric material, which is characterized by its usability for modifying surface tension of water, into jetting system container water 1597 administering solid particles into jetting system container water

FIG. 4C 1580 modifying a physical state of the jetting system by which the high pressure jet is jetted 1581 modifying a shape of an opening of at least one nozzle in response to the activation parameters, prior to the jetting of the high pressure jet 1582 modifying configuration of at least one nozzle of the group in response to the desired jetting direction prior to the jetting of the high pressure jet 1583 modifying the shape of the opening of at least one nozzle of the group to a different shape than the shape of the opening of at least one other nozzle of the group, in response to the desired direction 1584 controlling configuration of multiple nozzles of the group for controlling a narrowing location of a narrowing of the high pressure jet in response to the estimated distance

FIG. 4D

SYSTEM, A METHOD AND A COMPUTER PROGRAM PRODUCT FOR REDUCING DAMAGE BY MISSILES

RELATED APPLICATIONS

This application claims priority from Israeli patent application serial number 211513 filing date Mar. 2, 2011 which is incorporated herein by its entirety by reference.

FIELD OF THE INVENTION

This invention relates to improving safety, and especially to reducing of damage by missiles.

BACKGROUND OF THE INVENTION

While not all missiles are necessarily designed to hit a target (e.g. some missiles are used to launch satellites), many kinds of missiles, in the past, have been designed to hit various types of targets. These various kinds of missiles utilize different ways of guiding the missile to its target, e.g. heat-seeking, laser guidance, optical guidance, inertial navigation systems, GPS guidance, and so forth. Common to all of these types of missiles is the fact that the missile has to reach at least the environment of the target (if not hit the target itself) in order to cause it any damage.

Therefore, some of the missile defense systems developed were mounted on the target itself (or in its immediate proximity) in order to hit the missile during its final stages of approaching the target. Such systems include, for example, automated gun systems, active protection systems, electronic warfare equipment, decoy systems, explosive reactive armor, etc.

High pressure water jets are used in the prior art for cutting and processing machinery. The following documents discuss some examples of prior art use of high pressure jets for cutting and/or processing destination objects in a predetermined manner.

U.S. Pat. No. 6,533,640 discloses an ultra high pressure abrasive waterjet cutting apparatus for cutting nuclear reactor structural components. The cutting apparatus includes an ultra high pressure abrasive waterjet (UHP) cutting nozzle, movably connected to a single axis manipulator, and a collection hood. The manipulator and the collection hood are connected to a support frame and are configured to be positioned inside adjacent apertures of a nuclear reactor top guide or core plate so that the cutting nozzle is in alignment with the collection hood. The manipulator includes a linear frame, a nozzle support plate movably connected to the linear frame, and a motor operatively connected to the nozzle support plate. The collection hood includes an elongate collection chamber having an elongate aperture located so that the aperture is in alignment with the cutting nozzle. The collection hood also includes at least one positioning cylinder connected to the collection chamber and to the support frame which positions the collection chamber aperture adjacent a top guide or core plate beam. The collection hood further includes an outlet port configured to be connected to a water filtration system.

U.S. Pat. No. 7,121,918 discloses a machine tool for processing workpieces using a high-pressure water jet, the workpiece to be processed being mounted on a grate-like or grid-like support over or in a water basin, which is cuboid at least in the upper region, and has at least one water jet exiting from at least one nozzle applied to it, this nozzle being numerically controlled in its position at least in a horizontal plane (X, Y) and the distance between the workpiece and the nozzle being kept at least approximately constant or controlled in the vertical direction (Z) and an equalization container being provided in the region of the water basin, via which the level in the water basin is set, characterized in that at least one side wall on the water basin is designed as partially raisable or foldable and sliding elements, which allow a frame, having workpieces positioned on its workpiece supports, to be moved in and out, are positioned on at least the fixed side walls adjoining this side wall.

U.S. Pat. No. 7,047,857 discloses a machine for cutting the border of a workpiece using one or more water jet cutting tools separately carried by one or more monorail track mounted carriage assemblies. The machine can also include an aperture forming apparatus for forming circular apertures and/or elongated slots in the workpiece prior to/or simultaneously with the border trimming operation, all while the workpiece occupies a single work station in the machine. In one embodiment, the aperture forming apparatus features a cutting tool mounted on an elongate arm affixed to and extending from a plate which is fixedly oriented in a horizontal plane. While so oriented, a motor and gear assembly causes the plate to wobble in a circular pattern in the plane to, in turn, cause the tool to make a circular cut in the workpiece. In another embodiment of the apparatus, a motor rotates a cam carried on a free end of a stationary arm, the cam containing an eccentrically mounted cutting tool.

U.S. Pat. No. 7,008,305 discloses a water jet-processing machine comprising a workpiece holding table for holding a workpiece, a nozzle for applying processing water to the workpiece held on the workpiece holding table, and a processing water supply means for supplying processing water containing abrasive grains to the nozzles, wherein the water jet-processing machine comprises a plurality of the nozzles and an interval adjusting means for adjusting an interval between adjacent nozzles.

U.S. Pat. No. 6,955,107 discloses equipment for cutting particularly a paper web with a water jet. Discussed are support and positioning means and a cutting head supported on them extend in the operating position of the area of the edge part of a paper web. In the cutting head, there is a support surface and at least one nozzle, which is set in such a way that the edge part travels between the support surface and the nozzle. The equipment includes mechanical cleaning means and/or a cleaning construction for keeping the support surfaces clean. The cleaning means and/or cleaning construction are arranged on the opposite side of the paper web to the nozzle.

U.S. Pat. No. 5,839,927 discloses a water jet system that uses cantilever bars for an inlet grating, to prevent blockage. The water jet system also uses an elliptical impeller shaft housing to reduce turbulence and snagging of debris by the rotating impeller shaft. The water jet system uses impeller blades with a curved cross section that curves towards the direction of forward rotation. The water jet system uses U-shaped flanges mounted to the outlet of the water jet to provide steering.

U.S. Pat. No. 5,018,317 discloses an abrasive water jet cutting apparatus. In an apparatus for cutting a work by an abrasive water jet containing abrasive particles, an abrasive suspension, such that abrasive particles with an average size of up to about 1100 microns are held in suspension in water, is supplied to a jet nozzle assembly in which the abrasive suspension is induced by high pressure ejected water and directed against the work. The ejected water is passed through an ejected water passageway to which is connected an abrasive water orifice of an abrasive water nozzle tip. The abrasive water orifice has an upstream tapered portion the diameter of which gradually increases toward an upstream aperture at which the abrasive water orifice is connected smoothly to the downstream end of the ejected water passageway, whereby the flow of ejected water is streamlined. The abrasive suspension is supplied to, and merges with, the streamlined flow of the ejected water near the junction of the ejected water passageway and the abrasive water orifice, as an outer layer of the streamlined flow, whereby a dual-layer streamlined jet is obtained which enables fine cutting and also reduces wear of the nozzle tip.

SUMMARY OF THE INVENTION

A system for reducing damage by missiles to an aircraft, the system including: (a) a detector operable to detect a missile in a vicinity of the aircraft and to generate detection information indicative of motion of the missile; (b) a processor, configured to analyze the detection information and to selectively trigger activation of a jetting system that is mounted on the aircraft in response to a result of the analysis; and (c) the jetting system, operable to jet a high pressure jet onto the missile.

The detector may be mounted on the aircraft. The detector may be an optical detector, operable to detect the missile by detection of light reflected from the missile. The detector may be a light detection and ranging (LIDAR) detector, operable to emit laser pulses and to detect the missile by detection of light reflected from the missile.

The processor may be further configured to analyze the detection information to determine an assessed potential of damage by the missile to an engine of the aircraft, and to selectively trigger the activation of the jetting system in response to a result of the analysis.

According to an embodiment of the invention, a distance between a wing of the aircraft and a nozzle of the jetting system used for the jetting of the high pressure jet is shorter than a distance of the nozzle from a rearmost part of the aircraft, wherein the nozzle is located backwards of the wing.

According to an embodiment of the invention, the jetting system includes at least one jetting system container of water, wherein the jetting system is operable to jet onto the missile the high pressure jet that includes water from the at least one jetting system container.

According to an embodiment of the invention, at least one component of the jetting system is operable to administer polymeric material, which is characterized by its usability for modifying surface tension of water, into jetting system container water before jetting the high pressure jet that includes the water from the at least one jetting system container.

According to an embodiment of the invention, at least one component of the jetting system is operable to administer solid particles into jetting system container water before jetting the high pressure jet that includes the water from the at least one jetting system container.

According to an embodiment of the invention, the at least one jetting system container of water is hydraulically connected to a fresh water supply of the aircraft for at least a first period between a takeoff of the airplane to the triggering of the jetting system, wherein a ratio between water pressure in any of the at least one jetting system container and water pressure of the fresh water supply is less than 1 to 2 at times of such a hydraulic connection.

According to an embodiment of the invention, each of the at least one jetting system container is connected to a corresponding high pressure tank that contains high pressured gas in a pressure that exceeds 1,000 pounds per square inch (PSI), wherein any gas transmission permitting connection between each of the at least one jetting system container and its corresponding high pressure tank is blocked during the first period and is selectively opened in response to a command issued by the processor.

According to an embodiment of the invention, an angle between a jetting direction in which the jetting system is operable to jet the high pressure jet and a progression direction of the aircraft is between 175° and 185°.

According to an embodiment of the invention, an angle between a jetting direction in which the jetting system is operable to jet the high pressure jet and a progression direction of the aircraft is between 80° and 100°.

According to an embodiment of the invention, the processor is further configured to issue, following the analysis, an alert to an external aircraft system indicating that a jetting by the jetting system occurred.

The system according to any one of claims 14-27, wherein the processor is further configured to receive location information indicative of a location of the aircraft and to selectively prevent triggering of the activation of the jetting system in response to the location information.

According to an embodiment of the invention, the processor is further configured to receive from an external system of the aircraft environmental-condition-indicative-data that is indicative of at least one physical condition in an environment of the vehicle, and to determine activation parameters for the jetting system in response to the environmental-condition-indicative data.

According to an embodiment of the invention, the processor is further configured to determine activation parameters for multiple jetting instances of the jetting system.

According to an embodiment of the invention, the processor is configured to autonomously trigger the activation of the jetting system without receiving commands from any external system.

According to an embodiment of the invention, the processor is further configured to determine a desired jetting direction in response to the result of the analysis, wherein a configuration of at least one nozzle is modified prior to the jetting of the high pressure jet in response to the desired jetting direction.

According to an embodiment of the invention, the processor is further configured to determine activation parameters for the jetting system in response to the result of the analysis, wherein a shape of an aperture of at least one nozzle is modified prior to the jetting of the high pressure jet in response to the activation parameters.

According to an embodiment of the invention, the jetting system is operable to jet the high pressure jet from a group including multiple nozzles, wherein configuration of at least one nozzle of the group is modified prior to the jetting of the high pressure jet in response to the desired jetting direction, wherein the shape of the aperture of at least one nozzle of the group is modified to a different shape than the shape of the aperture of at least one other nozzle of the group, in response to the desired direction.

According to an embodiment of the invention, the jetting system is operable to jet the high pressure jet from a group including multiple nozzles, wherein the processor is configured to determine the activation parameters that include an estimated distance for hitting the missile, wherein the jetting system is operable to control the configuration of multiple nozzles of the group for controlling a narrowing location of a narrowing of the high pressure jet in response to the estimated distance.

According to an embodiment of the invention, the jetting system is operable to jet the high pressure jet onto the missile hitting the missile at an angle of less than 40° from an axis perpendicular to a progression direction of the missile at the time of the hit.

According to an embodiment of the invention, the jetting system is operable to increase the kinetic energy of the missile by jetting the high pressure jet onto the missile.

A method for reducing damage to an aircraft by missiles, the method including: (a) detecting a missile in a vicinity of the aircraft by a detector that is mounted on the aircraft, generating detection information indicative of motion of the missile; (b) analyzing the detection information; and (c) selectively triggering jetting of a high pressure jet onto the missile by a jetting system that is mounted on the aircraft, in response to a result of the analysis.

According to an embodiment of the invention, the analyzing further includes analyzing the detection information to determine an assessed potential of damage by the missile to an engine of the aircraft.

According to an embodiment of the invention, the method includes jetting of the high pressure jet onto the missile from at least one nozzle that is located so that a distance between a wing of the airplane and the nozzle is shorter than a distance of the nozzle from a rearmost part of the airplane.

According to an embodiment of the invention, the method includes jetting onto the missile the high pressure jet that includes water from at least one jetting system container of water, and administering polymeric material, which is characterized by its usability for modifying surface tension of water, into jetting system container water prior to the jetting of the high pressure jet.

According to an embodiment of the invention, the method includes jetting onto the missile the high pressure jet that includes water from at least one jetting system container of water, and administering solid particles into jetting system container water prior to the jetting of the high pressure jet.

According to an embodiment of the invention, the method includes jetting onto the missile the high pressure jet that includes water from at least one jetting system container of water that is hydraulically connected to a fresh water supply of the aircraft for at least a first period between a setting-off of the aircraft to the triggering of the jetting system, wherein a ratio between water pressure in any of the at least one jetting system container and water pressure of the fresh water supply is less than 1 to 2 at times of such a hydraulic connection.

According to an embodiment of the invention, the method includes jetting onto the missile the high pressure jet that includes water from at least one jetting system container of water that is connected to a corresponding high pressure tank that contains high pressured gas at a pressure that exceeds 1,000 pounds per square inch (PSI); blocking any gas transmission permitting connection between each of the at least one jetting system container and its corresponding high pressure tank during the first period; and selectively opening at least one gas transmission permitting connection between the at least one jetting system container and its corresponding high pressure tank or tanks, in response to a command issued by the processor.

According to an embodiment of the invention, the method includes determining activation parameters for multiple jetting instances of the jetting system.

According to an embodiment of the invention, the method includes determining activation parameters for the jetting system in response to the result of the analysis, and modifying a shape of an aperture of at least one nozzle in response to the activation parameters, prior to the jetting of the high pressure jet.

According to an embodiment of the invention, the method includes jetting the high pressure jet from a group including multiple nozzles of the jetting system, and modifying configuration of at least one nozzle of the group in response to the desired jetting direction prior to the jetting of the high pressure jet; wherein the method includes modifying the shape of the aperture of at least one nozzle of the group to a different shape than the shape of the aperture of at least one other nozzle of the group, in response to the desired direction.

According to an embodiment of the invention, the method includes jetting the high pressure jet from a group including multiple nozzles of the jetting system, determining the activation parameters that include an estimated distance for hitting the missile, and controlling configuration of multiple nozzles of the group for controlling a narrowing location of a narrowing of the high pressure jet in response to the estimated distance.

According to an embodiment of the invention, the method includes jetting the high pressure jet onto the missile hitting the missile at an angle of less than 40° from an axis perpendicular to a progression direction of the missile at the time of the hit.

According to an embodiment of the invention, the method includes jetting the high pressure jet onto the missile and increasing the kinetic energy of the missile by jetting the high pressure jet onto the missile.

A program storage device readable by machine, tangibly embodying a program of instructions executable by the machine to perform a method for reducing damage to an aircraft by missiles including the steps of: (a) receiving detection information that was generated by a detector mounted on the aircraft and which is indicative of motion of a missile detected by the detector in a vicinity of the aircraft; (b) analyzing the detection information; and (c) selectively triggering jetting of a high pressure jet onto the missile by a jetting system that is mounted on the aircraft, in response to a result of the analysis.

According to an embodiment of the invention, the analyzing further includes analyzing the detection information to determine an assessed potential of damage by the missile to an engine of the aircraft.

According to an embodiment of the invention, the program storage device further includes issuing a command for modifying a state of a hydraulic connection between a fresh water supply of the aircraft and at least one jetting system container of water that contains water used for the jetting onto the missile of the high pressure jet and which is hydraulically connected to the fresh water supply of the aircraft for at least a first period between a setting-off of the aircraft to the triggering of the jetting system.

According to an embodiment of the invention, the program storage device further includes determining a desired jetting direction in response to the result of the analysis, and issuing a modification command instructing a jetting system component to modify a configuration of at least one nozzle prior to the jetting of the high pressure jet in response to the desired jetting direction.

According to an embodiment of the invention, the program storage device further includes determining activation parameters for multiple jetting instances of the jetting system.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 4B through 4D illustrate various stages of the method of FIG. 4A, according to various embodiments of the invention;

Figure 1:
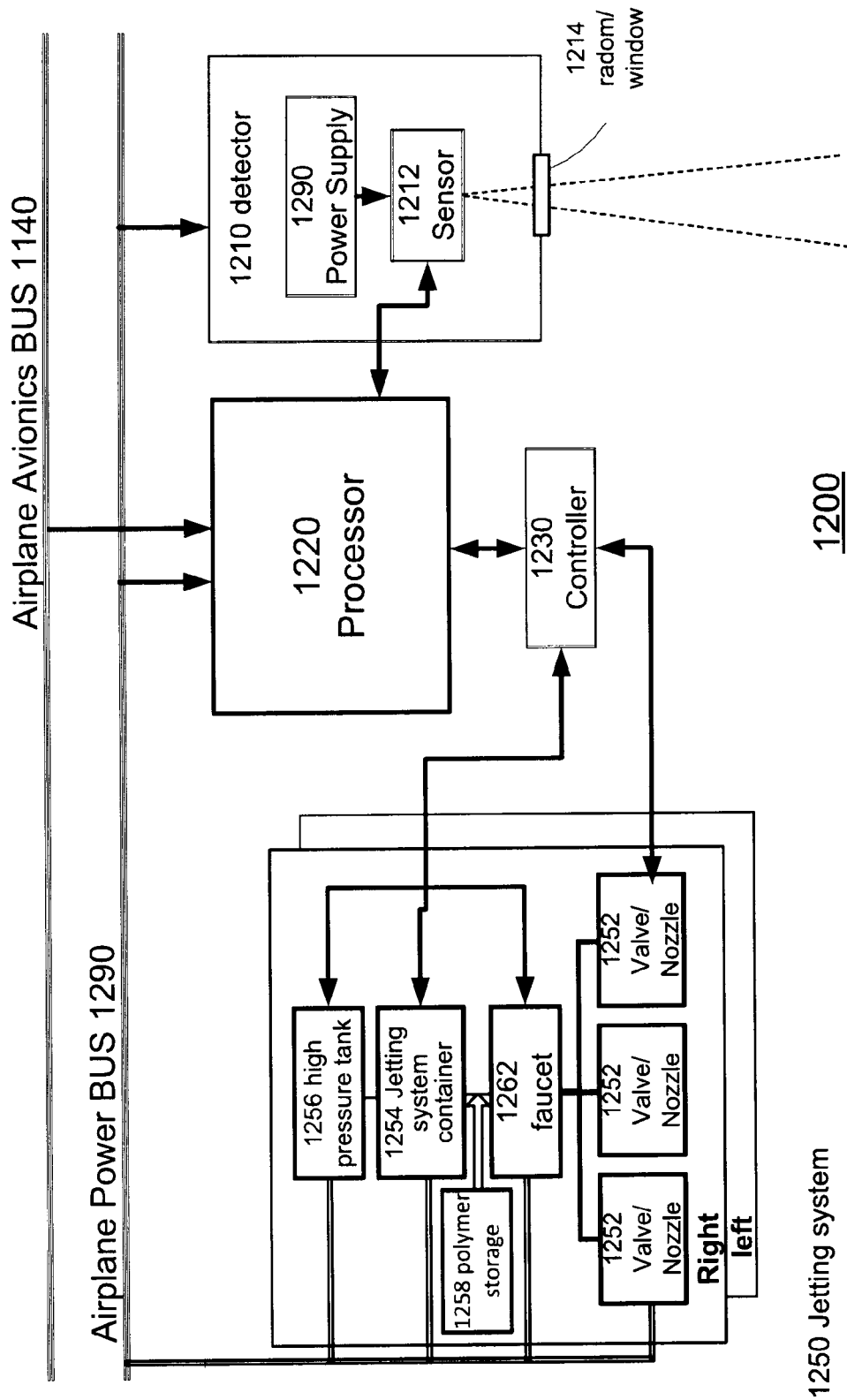
FIG. 1 is a block diagram of a system for reducing damage by missiles to a vehicle, according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In the drawings and descriptions set forth, identical reference numerals indicate those components that are common to different embodiments or configurations.

The operations in accordance with the teachings herein may be performed by a computer specially constructed for the desired purposes or by a general purpose computer specially configured for the desired purpose by a computer program stored in a computer readable storage medium.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter one or more stages illustrated in the figures may be executed in a different order and/or one or more groups of stages may be executed simultaneously and vice versa. The figures illustrate a general schematic of the system architecture in accordance with an embodiment of the presently disclosed subject matter. Each module in the figures can be made up of any combination of software, hardware and/or firmware that performs the functions as defined and explained herein. The modules in the figures may be centralized in one location or dispersed over more than one location.

FIG. 1 illustrates system 1200 for reducing damage by missiles, according to an embodiment of the invention. It is noted that system 1200 may be used to reduce damage by missiles to a vehicle (denoted 1100), but this is not necessarily so—and some embodiments of system 1200 may be used for reducing damage by missiles to stationary targets (such as a building, electricity infrastructure, etc.). It should be noted that while some of the subsequent discussion exemplifies the invention in relation to various exemplary types of vehicles, a person who is of skill in the art would readily know that certain modifications are required when implementing the invention for stationary targets.

Clearly, various embodiments of system 1200 may be adapted and installed on various types of vehicles, and therefore the specific requirements for different types of vehicles, for different paths of such vehicles, for different types of missiles, and so forth may dictate different implementations of system 1200. Some of the types on which system 1200 may be used are various types of aircraft (e.g. airplane, helicopter, UAV, airship, etc.), various types of naval vehicles (e.g. a ship, aircraft carrier, etc.), various types of ground vehicles (e.g. truck, heavy machinery, an armored ground vehicle such as a tank or an armored personnel carrier, etc.), and different combinations thereof (e.g. hovercraft).

It is noted that some embodiments of system 1200 may be closely integrated into a vehicle 1100 onto which such a system may be installed (e.g. even during manufacture thereof), while other embodiments may be standalone systems that are installed on vehicle 1100 and which in some implementation may even be moved from one vehicle to another.

It is further noted that in some embodiments of the invention, some components of system 1200 may also be used by other systems of vehicle 1100, and in some instances may be otherwise regarded as systems of vehicle 1100 itself. By way of example, power supply 1290 of system 1200 may be an independent power supply integral to system 1100, while in other implementations components of system 1200 may receive power from a power supply of vehicle 1100, in which case that power supply—even though it previously existed in vehicle 1100, may be regarded as power supply 1290 of system 1200 for the sake of the following discussion.

Likewise, it is noted that in the description of the invention, components of system 1200 which are described and/or exemplified as implemented as a certain number of components may be implemented in some embodiments using more or less components than described, as will be clear to any person who is of skill in the art. For example, even if a single power source 1290 is described and exemplified in the figures, utilization of more than one separate power source (e.g. different power sources for different components of system 1200) exceed neither the scope of the invention nor the scope of the disclosure. Taken in combination, it would be clear that—continuing the above examples—power source 1290 may be implemented as several power sources utilized for some of the components of system 1200 together with provision of power by systems of the vehicle 1100 to other components of system 1200.

System 1200 is intended to hit at least one missile in a vicinity of vehicle 1100 with one or more high pressure jets (e.g. of water), wherein such capabilities may be used for potentially reducing a possible damage of missile strikes. As will be discussed below in greater detail, according to various embodiments of the invention, system 1200 may include one or more detectors 1210, wherein each of the optional one or more detectors 1210 is operable to detect a missile in a vicinity of vehicle 1100 and to generate detection information indicative of motion of the missile (one or more detectors may also be located away from the vehicle); a processor 1220 that is configured to analyze the detection information and to selectively trigger—in response to a result of the analysis—activation of a jetting system 1250 that is mounted on the vehicle 1100 and which is operable to jet a high pressure jet onto a missile.

As stated above, system 1200 may include at least one detector 1210 that is operable to detect a missile (denoted 20, e.g. in FIG. 2B) in a vicinity of the vehicle 1100, and to generate detection information indicative of motion of the missile. In some embodiments of the invention, detector 1210 is mounted on vehicle 1100, but this is not necessarily so and in other implementations detectors external to vehicle 1100 may also be utilized.

It is noted that various types of detectors 1210 may be implemented in various implementations of system 1200—such as radar, light detection and ranging (LIDAR), optical detector, acoustic detector, and so forth. All the more so, system 1200 may include more than a single detector 1210 of one or more types (and/or receive information from one or more external detectors of one or more types). Different types of detectors may provide different kinds of detection information, detection information of varying quality (e.g. spatial and/or temporal resolution), and so forth.

It should be noted that in some embodiments of the invention, external detectors may be used—either instead of or in addition to the one or more detectors 1210 installed on vehicle 1100. Note should therefore be taken that wherever various embodiments and possible implementations are discussed in relation to detector 1210 (that is understood to be installed on the vehicle 1100 itself), parallel embodiments and implementations may also be implemented for external detectors (if applicable), even if not explicitly elaborated so.

Selection of the type of detector 1210 for a specific implementation may be made in considerations of various parameters, such as parameters of the detector itself (e.g. cost, size, electrical requirements, capabilities and so forth), parameters of vehicle 1100 (e.g. size of the vehicle, geometry of the vehicle and especially the positioning of its engines 1110, existing detectors previously installed in vehicle 1100, and so forth), parameters pertaining to expected use (e.g. expected regime of velocities and altitudes), and so forth. It is however noted that any of all relevant detectors (e.g. as exemplified above) may be implemented in the different embodiments of the invention, mutatis mutandis, unless there is a physical prevention to such a combination.

As will be clear to a person who is of skill in the art, detector 1210 may include various components such as one or more sensors 1212, a Radom or window that permits transmission of radiation detectable by such sensors 1212 (if applicable, denoted 1214), and so forth.

According to an embodiment of the invention, detector 1210 is a light detection and ranging (LIDAR) detector, operable to emit laser pulses and to detect the missile by detection of light reflected from the missile. According to an embodiment of the invention, detector 1210 may be any other optical detector operable to detect the missile by detection of light reflected from the missile—either light emitted by such a detector or by a dedicated light source (which may or may not be controlled by such a detector), or light unrelated to the detector. For example, the optical detector may be a wide-beam laser detector.

The detection information provided by detector 1210 may include any combination of a wide range of parameters in different embodiments of the invention. For example, the detection information may include information pertaining to one or more of the following parameters—current location and/or current locations of the missile (especially in relation to vehicle 1100), future expected location of the missile, relative speed of the missile, size of the missile, and so forth. In case more than one missile is detected, the detection information may pertain to each detected missile separately.

It is noted that various types of detectors 1210 and various configurations thereof (e.g. in relation to a body of vehicle 1100) may be utilized for different scenarios and utilizations. Considerations pertaining to the specific scenario and utilization for which a design of a certain implementation of system 1200 is made may determine the vicinity to vehicle 1100 in which a detector 1210 should be operable to detect the missile 20. It is noted that a detection zone of each of the one or more detectors 1210 implemented may not be symmetrically located with respect to vehicle 1210, both due to physical constrains and to requirements.

Figure 2A:
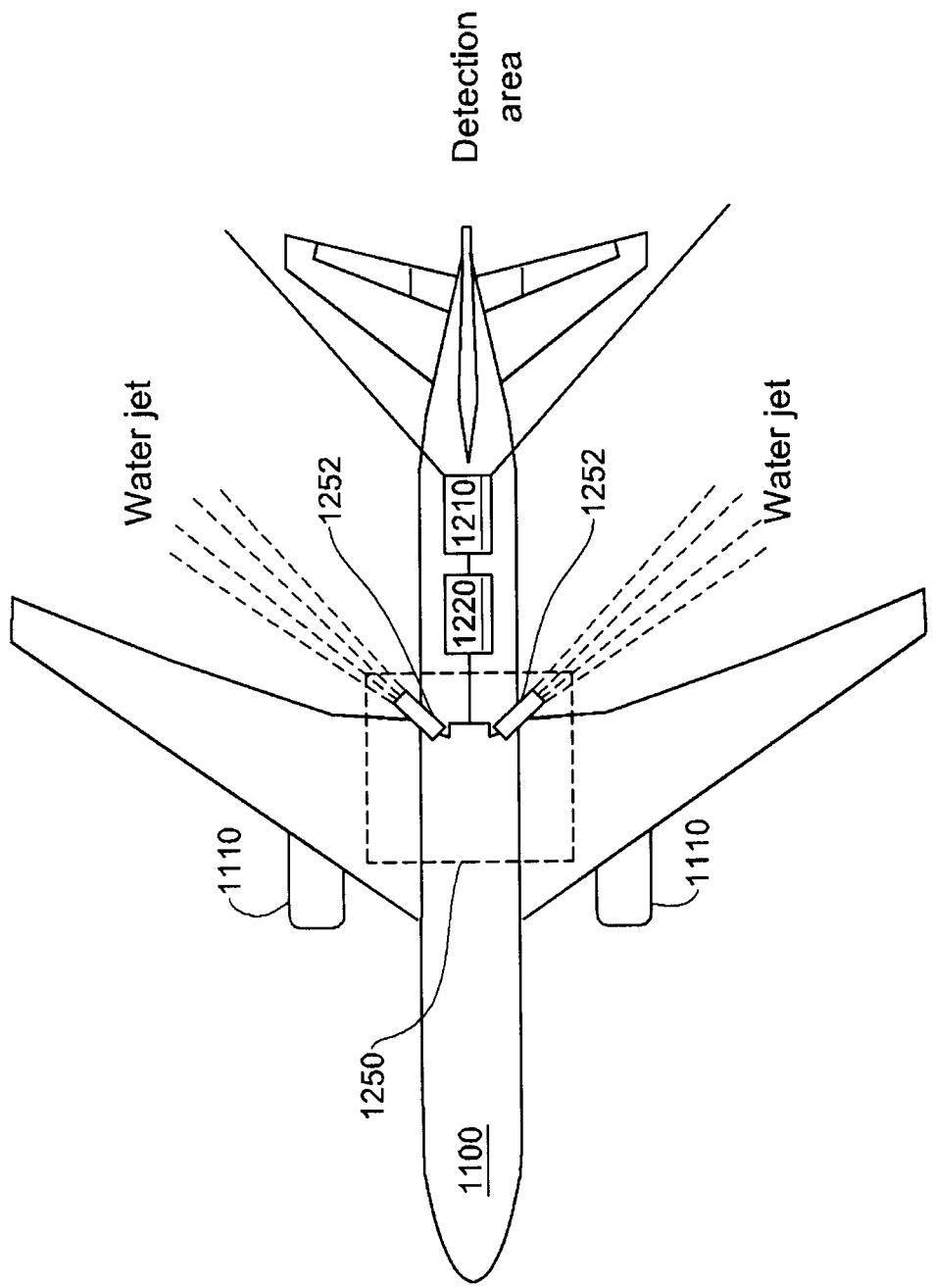
FIGS. 2A through 2F illustrate some possible implementations of the system of FIG. 1 on various types of vehicles, according to various embodiments of the invention.

In an example, heat seeking missiles are expected to seek the heat of the engine 1110 of vehicle 1100, and are therefore expected to arrive from the direction to which heat is exhausted from the engine 1110. By way of further example, if the vehicle 1100 is an airplane, the zone of interest for detection of missiles is mostly in a back area of the airplane, e.g. as exemplified in FIG. 2A, because heat-seeking missiles are commonly guided towards the heat of the engines 1110 of the airplane.

Clearly, different embodiments of the invention may be capable of handling different types of missiles. For example, while some implementations may handle relatively small missile, such as man-portable air-defense systems (MANPADS) missile (e.g. shoulder-launched surface-to-air missiles such as FIM-92 Stinger) which may weigh, for example, as little as 3-15 Kg at the time of approaching the aircraft, or anti-tank guided missile (ATGM, such as FGM-148 Javelin), other implementations may be able to reduce damage by much larger missiles such as air-to-air missile, air-to-ground missiles, sea-to-ground missiles, and so forth.

The vicinity to the vehicle 1100 in which detector 1210 may be required to detect missiles is usually in a range of tens, hundreds, or thousands of meters (e.g. 10-1,000 meters) in its longest dimension (e.g. backwards and downwards of an engine of an airplane, for a heat-seeking missile fired from the ground), and is generally determined with respect to expected velocities of vehicle 1100, to the timing of operation of system 1200 (and especially of processor 1220 and of jetting system 1250), and to the dimensions of vehicle 1100 (especially a distance between the detector 1210 and any one or more of the engines 1110, and/or projections thereof).

It is however noted that the distance in which detector 1210 may be operable to detect missiles may well exceed the minimal required distance (especially for some kinds of detectors) and in some situations may even come short of that distance (e.g. in poor weather conditions). In any case, the vicinity to vehicle 1100 in which a detector 1210 is operable to detect missiles may be determined on a case by case basis, in consideration with the above parameters.

Some or all of the detection information generated by any of the one or more detectors 1210 (if implemented)—and especially detection information indicative of the motion of one or more missiles 10 detected—is communicated to processor 1220 of system 1200. It is noted that such detection information may be processed in some manner before it reaches processor 1220, and it is not necessarily transmitted as raw data. For example, an aggregation unit (that may be a part of processor 1220, but not necessarily so) may aggregate detection information gathered by several detectors 1210 if implemented, and/or may correct data gathered by a first detector in response to information received from another.

According to an embodiment of the invention, processor 1220 may be connected to detector 1210 either directly (e.g. using data cable connections, using wireless connection, etc.) or indirectly (e.g. using communication system of vehicle 1100, via a preprocessing unit—not illustrated, via a database—not illustrated—to which detector 1210 saves its detection information and which is accessible to processor 1220, and so forth). In some embodiments, processor 1220 may even be integrated with detector 1210 and/or with a processor thereof.

Processor 1220 is configured to selectively trigger activation of a jetting system 1250 that is mounted on vehicle 1100. According to an embodiment of the invention, processor 1220 may be further configured to analyze the detection information (some or all of it), wherein processor 1220 may be configured to selectively trigger the activation of the jetting system in response to a result of the analysis.

It is noted that in some embodiments of the invention, processor 1220 may be configured to selectively trigger the activation of the jetting system in response to other events—and not necessarily to analysis of detection results. For example, according to an embodiment of the invention, processor 1220 may be configured to selectively trigger the activation of jetting system 1250 according to timing information, to location information, to instructions of another system, and so forth. In an exemplary implementation, processor 1220 may be configured to recurrently selectively trigger the activation of jetting system 1250 for jetting high pressure jets when vehicle 1100 is entering a threatened position (e.g. when a tank approaches its firing position and has to at least partly leave a barrier it was hiding behind and expose itself for several seconds in which the firing process takes place).

As will be described in more detail below, jetting system 1250 is operable to jet at least one high pressure jet which may be used to hit a missile (following a successful triggering of jetting system 1250) and as such to reduce its damage potential to vehicle 1100.

It is noted that in different embodiments of the invention, processor 1220 may be implemented in different ways. For example, processor 1220 may be a dedicated processor designed to implement the functionalities of system 1200, may be a programmable processor programmed to implement the functionalities of system 1200, a general purpose processor operable to run dedicated software that implements functionalities of system 1200, a processor of vehicle 1100 (or of another subsystem thereof) that can run a dedicated software, a combination of any of the above, and so forth.

A communication between processor 1220 and jetting system 1250 may be facilitated, according to some embodiments of the invention, via one or more controllers 1230 that are operable to control an activation and/or operation of jetting system 1250, and which are configured to receive instructions from processor 1220. Controller 1230 may be implemented (if at all) as part of processor 1220, as part of jetting system 1250, and as an independent unit.

The selective triggering of the activation of the jetting system 1250 may be intended to result in activation of jetting system 1250 only in situations in which such operation is regarded as desired—e.g. for prevention of missile strike to an engine 1110 (or other part of vehicle 1100) or for reducing the likelihood of such an incident. In other embodiments of the invention, other considerations and/or decision rules may be implemented—either alternatively or in addition to those described above.

It is noted that processor 1220 may receive from detector 1210 for analysis only detection information which pertains to positive detection, but this is not necessarily so, and in some embodiments of the invention detector 1210 and/or any component intermediating between it and processor 1220 may not be required to determine whether detection actually occurred—and this task may be assigned to processor 1220.

Since system 1200 may be designed and/or considered an emergency security system, in various implementations it may operate at its own discretion, without intervention by an external system and/or human intervention. Therefore, according to an embodiment of the invention, processor 1220 may be configured to autonomously trigger the activation of the jetting system without receiving commands from any external system—wherein, it should be noted, even when the originator of commands is a person (e.g. a driver of vehicle 1100), the commands are transmitted to processor 1220 via an external system (e.g. operated by that person).

In some embodiments of the invention, an external system (or person) may have some influence regarding the activation of system 1200, and especially of jetting system 1250. Not only can such an external entity provide information which may affect the selective determining by processor 1220 (e.g. information of vehicle system indicating external metrological conditions), in some embodiments such an external entity may determine, for example, an activation permission status for system 1200 or for components thereof.

It should be noted that such an external entity may not be located onboard vehicle 1100. In an example, in some implementations an activation of the jetting system 1250 may not be desired in some locations or conditions (e.g. at ground level, within hangers, etc.), wherein entities that prevent the jetting in such location may be positioned onboard (possibly even as part of system 1200) and/or externally to it (e.g. a remote ground system). In another example, an external entity may instruct the triggering of the activation of jetting system 1250 using lower than normal thresholds of detection—e.g. following visual detection of a group of missiles (either by driver, RADAR etc.), in areas that are more prone to missile strikes, when other conditions of vehicle 1100 deteriorate and it is more susceptible to missile strike damage, and so forth.

Other than selectively determining to trigger the jetting system 1250 (and thus determining timing of the jetting of the high pressure jet by jetting system 1250), processor 1220 may be further configured to determine activation parameters of jetting system 1250, where and if applicable. Determination of such activation parameters for jetting system 1250 may be responsive at least in part to a result of said analysis, but this is not necessarily so. For example, one scenario in which activation parameters may be determined in respect to other kinds of factors is limiting a pressure of the high pressure jet until leaving designated area (e.g. parking, airfield, sea-port, etc.).

According to an embodiment of the invention, processor 1220 may be further configured to receive location information indicative of a location of vehicle 1100 (be it absolute location information such as GPS positioning data, relative location information such as distance from a given point, and/or partial location information such as altitude only, and so forth) and to selectively prevent triggering of the activation of jetting system 1250 in response to the location information. This may be used, for example, for preventing activation of the system within the area of a parking, an airport, a sea-port, at ground level, below or above a given altitude, and so forth. As described in more detail elsewhere in this application, such location information may be used by processor 1220 for other needs as well, such as determining activation parameters, etc.

In some examples of various embodiments of the invention, activation parameters that may be determined by processor 1220 (e.g. in response to its analysis of detection information received from one or more detectors 1210 and/or from other sensors, in response to vehicle 1100 information received from systems of the vehicle, in response to a condition of system 1200 such as available amount of water for jetting, and any combination thereof) are:

- Desired direction of jetting (if modification of jetting direction is possible);
- Identity of one or more nozzles that should participate in the jetting (if more than one nozzle is implemented);
- Number and timing of multiple jets to be jetted, whether concurrently or sequentially (if jetting of multiple jets is desired);
- Amount of water and/or pressure thereof for the high pressure jet (if can be modified);
- Prerequisite activities that should be performed prior to the jetting, such as frost melting (if implemented, possible and required).

It should be noted that this list is not inclusive by any means and that other activation may be implemented (if at all), either in addition or instead of any combination of the above example parameters.

As aforementioned, at least some of the parameters that may influence a decision and/or value determination/selection by processor 1220 may be received from external system of vehicle 1100. In an example, processor 1220 may be further configured to receive from at least one external system of vehicle 1100 (such as vehicle avionics system represented by BUS 1140 in FIG. 1) environmental-condition indicative-data that is indicative of at least one physical condition in an environment of vehicle 1100, and to determine activation parameters for jetting system 1250 in response to the environmental-condition indicative-data. Some examples of such environmental conditions that may be indicated in the environmental-condition indicative-data according to various embodiments of the invention are environmental pressure, wind direction and intensity, humidity, temperature, etc.

In most scenarios, processor 1220 would take into consideration the velocity of vehicle 1100 (and more specifically—the relative velocity of the missile 20 in relation to vehicle 1100, but the velocity of the missile itself is usually negligible in relation to the velocity of the vehicle) when determining the timing and possibly additional activation parameters of jetting system 1250. The additional data considered, such as the parameters and information exemplified above, and among which the environmental-condition indicative-data, may be used to affect this determination (usually only refining it, but not necessarily so).

Since striking by a missile when the hit is made to some parts of vehicle 1100 is more dangerous than when a hit is made to others (e.g. armored parts), prioritization may be made to focus the activity of system 1200 in some areas of vehicle 1100 and its environment in comparison to other areas. Such focusing may be implemented both by detector 1210 (e.g. setting of detection area), by processor 1220 (e.g. in its analysis of the detection information), and by jetting system 1250 (e.g. by positioning of the nozzles of jetting system 1250 accordingly).

According to an embodiment of the invention, processor 1220 is further configured to analyze the detection information to determine assessed potential of damage by the missile to an engine 1110 (or to several engines 1110) of vehicle 1100, and to selectively trigger the activation of jetting system 1250 in response to a result of the analysis. In other embodiments, processor 1220 may likewise determine assessed potential of damage to other parts of the vehicle (e.g. wheels, vehicle propulsion system, windshield, tail) and to selectively trigger the activation of jetting system 1250 accordingly.

Additionally, according to an embodiment of the invention, processor 1220 may be further configured to issue, following the analysis (and either before, during, or after the jetting itself) an alert to at least one external system (a vehicle system and/or a system external to vehicle 1100) indicating that a jetting by jetting system 1250 occurred. Such information may affect, in an example, a decision of a driver of vehicle 1210 to modify course of the vehicle (e.g. to cancel the planned course and to direct the vehicle 1100 to a safe stationary location as soon as possible, etc). It is noted that additional alerts may be made regardless of any specific jetting—e.g. detector 1210 may detect several missiles in a vicinity of vehicle 1100 that are not expected to hit any engine 1110 of the vehicle, but this information may nevertheless be useful to a driver who may decide to change a course of vehicle 1100.

Figure 3:
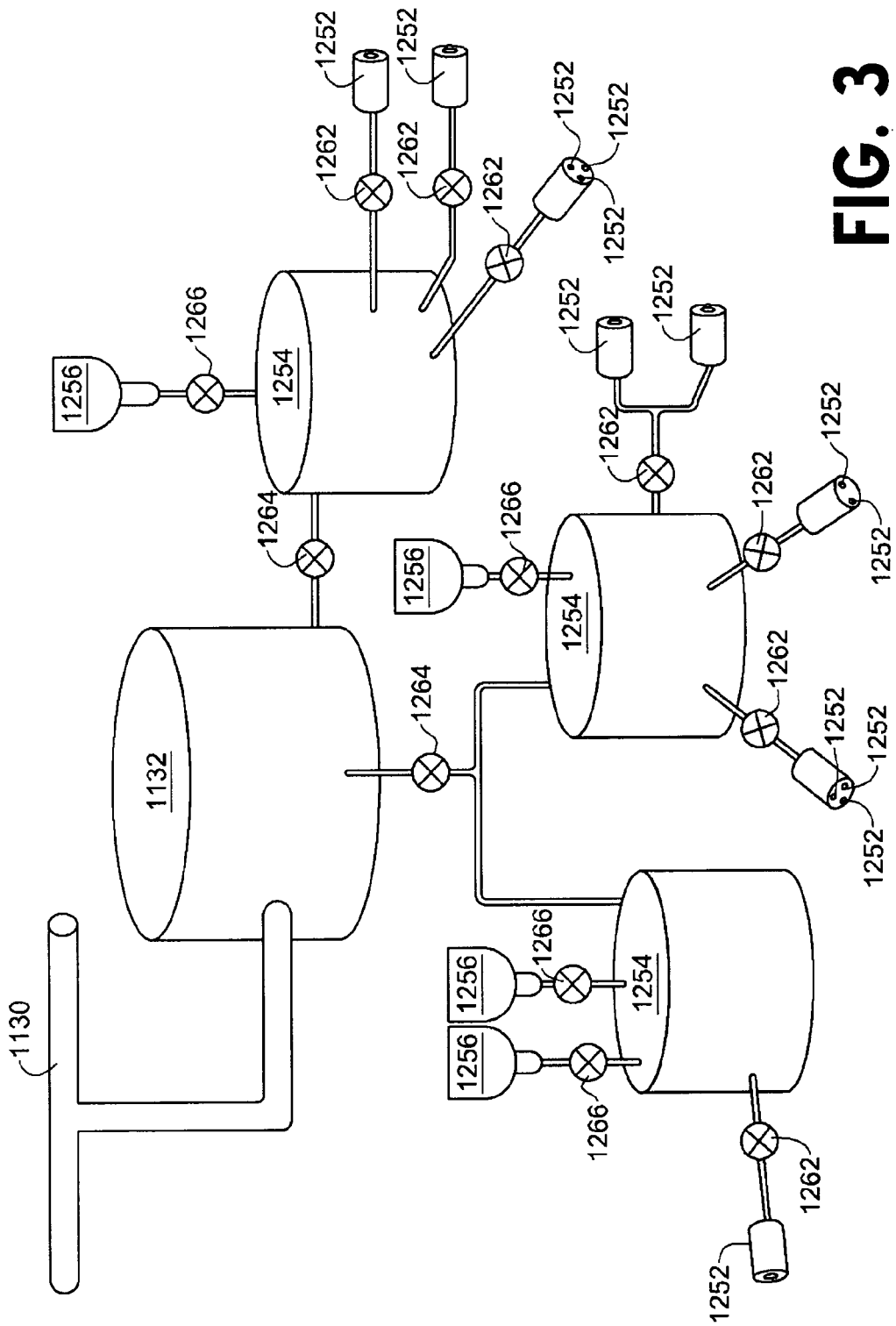
FIG. 3 is illustrates a jetting system, according to an embodiment of the invention.

Referring now to jetting system 1250 that is operable to jet the high pressure jet onto the missile 20. A possible implementation of jetting system 1250 is schematically illustrated in FIG. 3. As will be demonstrated below, according to various embodiments of the invention, jetting system 1250 may be operable to jet a different number of jets (e.g. a single jet, multiple jets jetted at different times, multiple jets jetted concurrently in a predetermined configuration, and so forth), in different timing regimes, in different configurations, shapes, intensities, and so forth.

Jetting system 1250 includes one or more nozzles 1252 from which high pressure jets may be jetted. Each of the one or more nozzles 1252 is characterized by having an aperture or spout from which fluid of the high pressure jet is discharged during its jetting. It is noted that size, shape, material, efficiency, capabilities, etc. may differ between different nozzles 1252 of a single jetting system 1250, and between different implementations of system 1200.

According to an embodiment of the invention, the high pressure jet is a jet of water. It is noted that such water may or may not include any dissolved material in a quantity that effectively influences the behavior of the jetted water when compared to pure water. Such water may be, for example, tap water or general reservoir water, and may come—by way of example, from a fresh water supply system 1130 of vehicle 1100, if implemented.

According to other embodiments of the invention, the high pressure jet may include other types of fluids, such as water (e.g. similar to the above discussed water) to which one or more materials (e.g. polymers) were added, for example in order to modify a physical characteristic of that fluid—e.g. surface tension thereof. In other embodiments, other types of fluids may be used, such as a combination of water with any other liquid or gas, and different types of liquids.

According to an embodiment of the invention, solid particles (e.g. metal particles) may be administered into jetted fluid of the high pressure jet before it is being jetted. It should be noted that the use of solid particles in the jetted fluid may better be avoided in some situations (e.g. when fluid of the high pressure jet may hit components of vehicle 1100—e.g. an engine 1110 thereof), and may be useful in others (e.g. for better affecting the missile 20).

While the possible types of fluids that may be jetted by jetting system 1250 is not limited to those exemplified above, it is noted that utilization of water for the jetting may be preferred in some scenarios, at least for the following reasons:

Water is dense enough a fluid to acquire enough tension to substantially affect a trajectory of the missile.

Water is practically harmless to engines 1110 or other parts of vehicle 1100—it is noted that engines 1110 and other vehicle parts are designed and tested to withstand high amounts of water (e.g. during rain).

Water is neither toxic nor explosive, and is considered safe by aviation regulation bodies to be stored and utilized in vehicles without additional measures of precaution.

Water is already carried by many commercial vehicles (especially by those used for passenger transportation).

It is however noted that despite of the above, the invention is by no means restricted to water jets only, and other fluids (especially, though not necessarily, liquids) may be utilized—in addition to or without water.

It should be noted that administering of solid particles or other types of liquid material (or any combination thereof) to the jetted fluid has lesser implication on operation of the vehicle if fluid of the high pressure jet is not expected to hit or enter any substantial component of the vehicle (e.g. its engine, an air inlet of such engine, a passenger compartment, and so forth). For example, if the vehicle 1100 is an airplane and system 1200 is designed to be effective against heat seeking chasing missiles which are expected to arrive from behind and below the airplane, that jetting of the fluid backwards than the engine or any inlet enables utilization of fluids that may not be used in front of the engine (e.g. for prevention of objects entering a front aperture of the engine).

According to an embodiment of the invention, at least one component of jetting system 1250 is operable to administer polymeric material (e.g. from polymeric material storage, not illustrated), which is characterized by its usability for modifying surface tension of water, into jetting-system-container water before jetting the high pressure jet that includes the water from the at least one jetting system container 1254. The polymeric material may be added to the water when in the jetting system container 1254, but may also be added at a later stage prior to the jetting.

According to an embodiment of the invention, at least one component of jetting system 1250 is operable to administer solid particles (e.g. metal particles, e.g. from metal particles storage 1258) into jetting system container water before jetting the high pressure jet that comprises the water from the at least one jetting system container 1254. The solid particles may be added to the water when in the jetting system container 1254, but may also be added at a later stage prior to the jetting.

Desired position of the one or more high pressure jets in relation to the vehicle may differ in different scenarios, depending on factors such as (for example) type of the vehicle, desired type and extent of protection, implemented detection capabilities, available jetting capabilities (e.g. pressure, distance, volume), type of threat (e.g. missile size and weight), and so forth.

It would therefore be clear to a person who is of skill in the art that the various locations described and illustrated below are only exemplary, and that other locations—of jets, of nozzles, and/or of other components of system 1200 such as of jetting system 1250 and/or of detector 1210—may also be implemented (in some scenarios possibly even in a more efficient way, mutatis mutandis).

It should be noted that in various embodiments of the invention, each of the different possible locations on the vehicle in which jets may be installed may have advantages in different scenarios/situations, and it is therefore further stressed that the exemplified locations are but mere examples of locations that may be useful in some of those possible scenarios/situations.

Figure 2B:
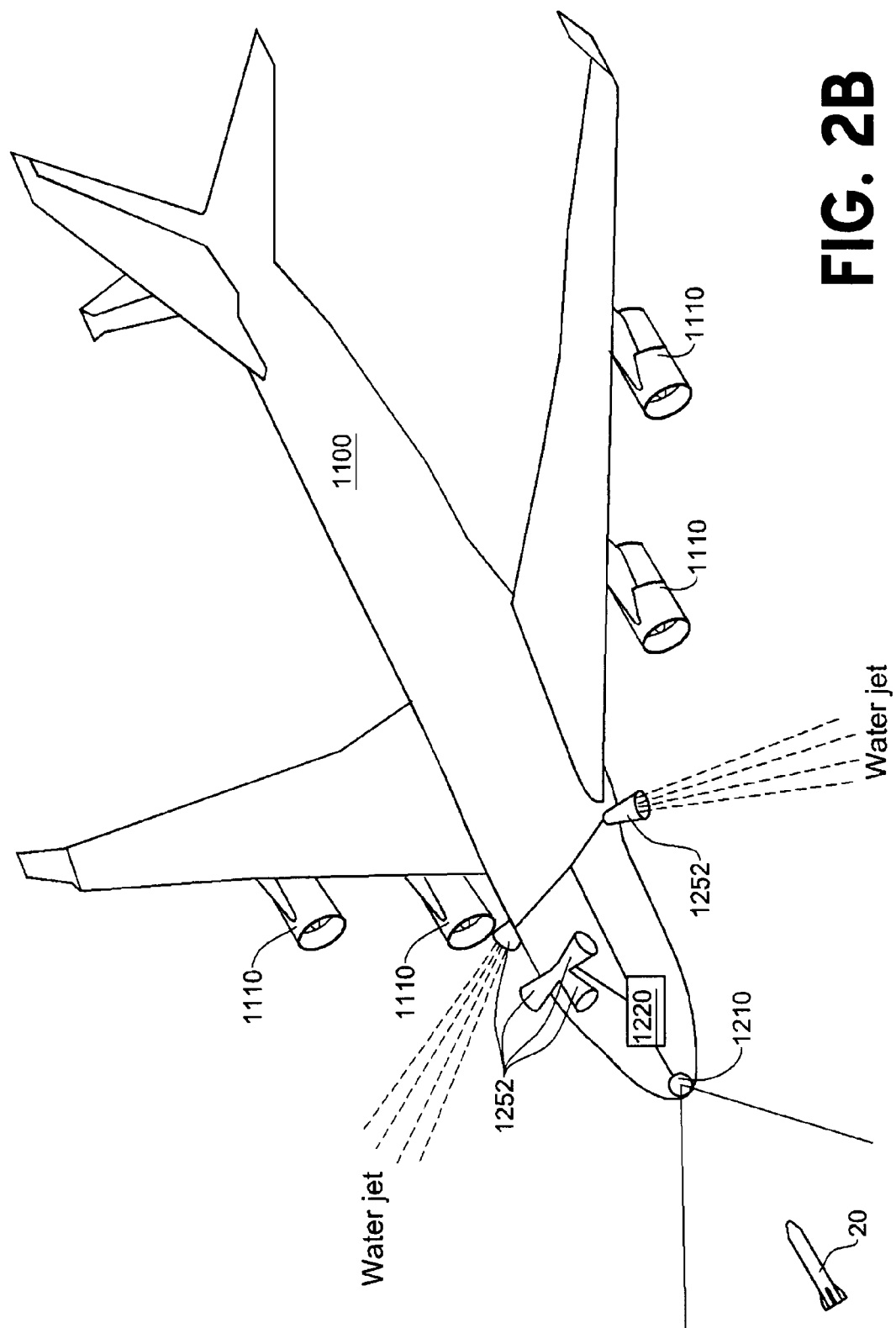
Figure 2C:
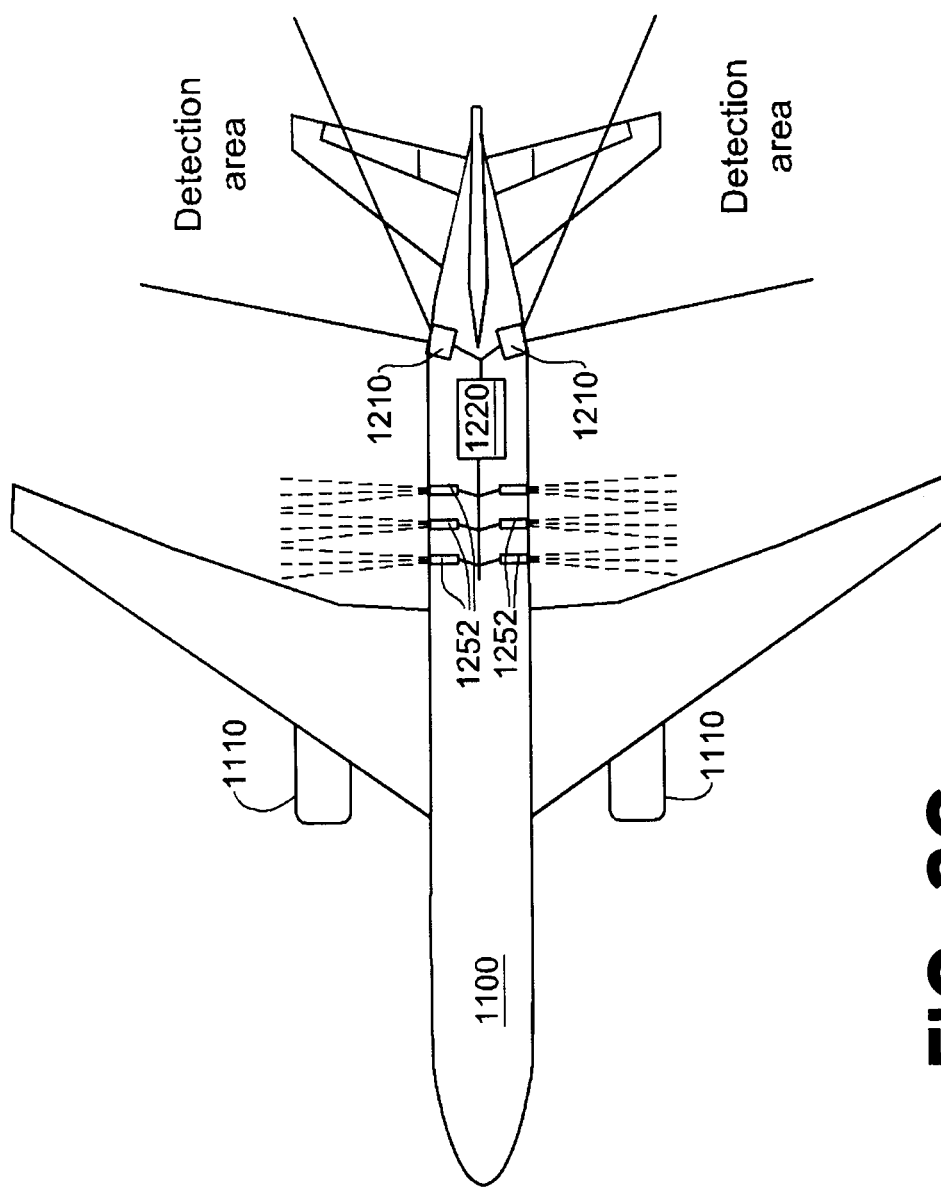
Figure 2D:
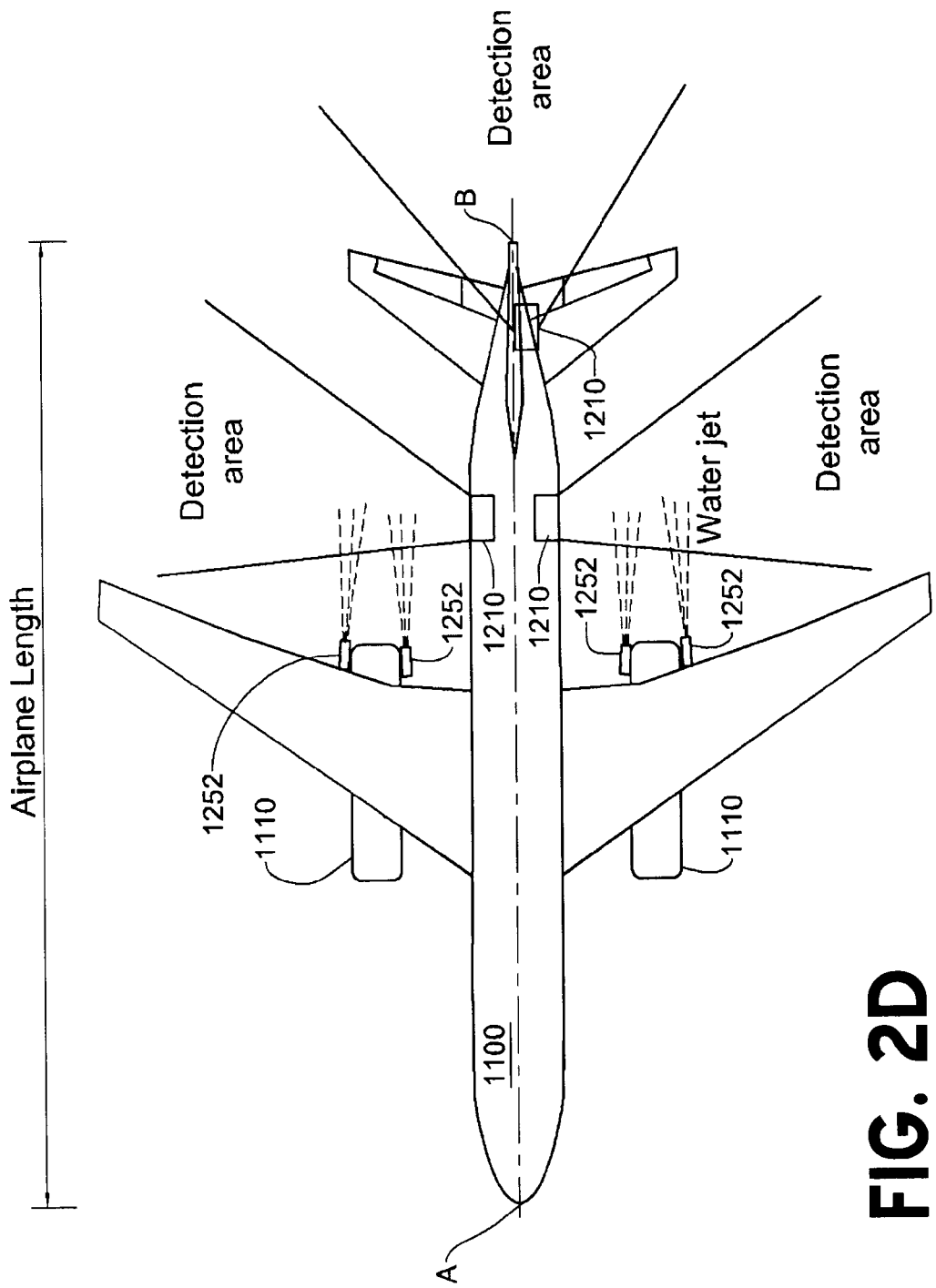
Figure 2E:
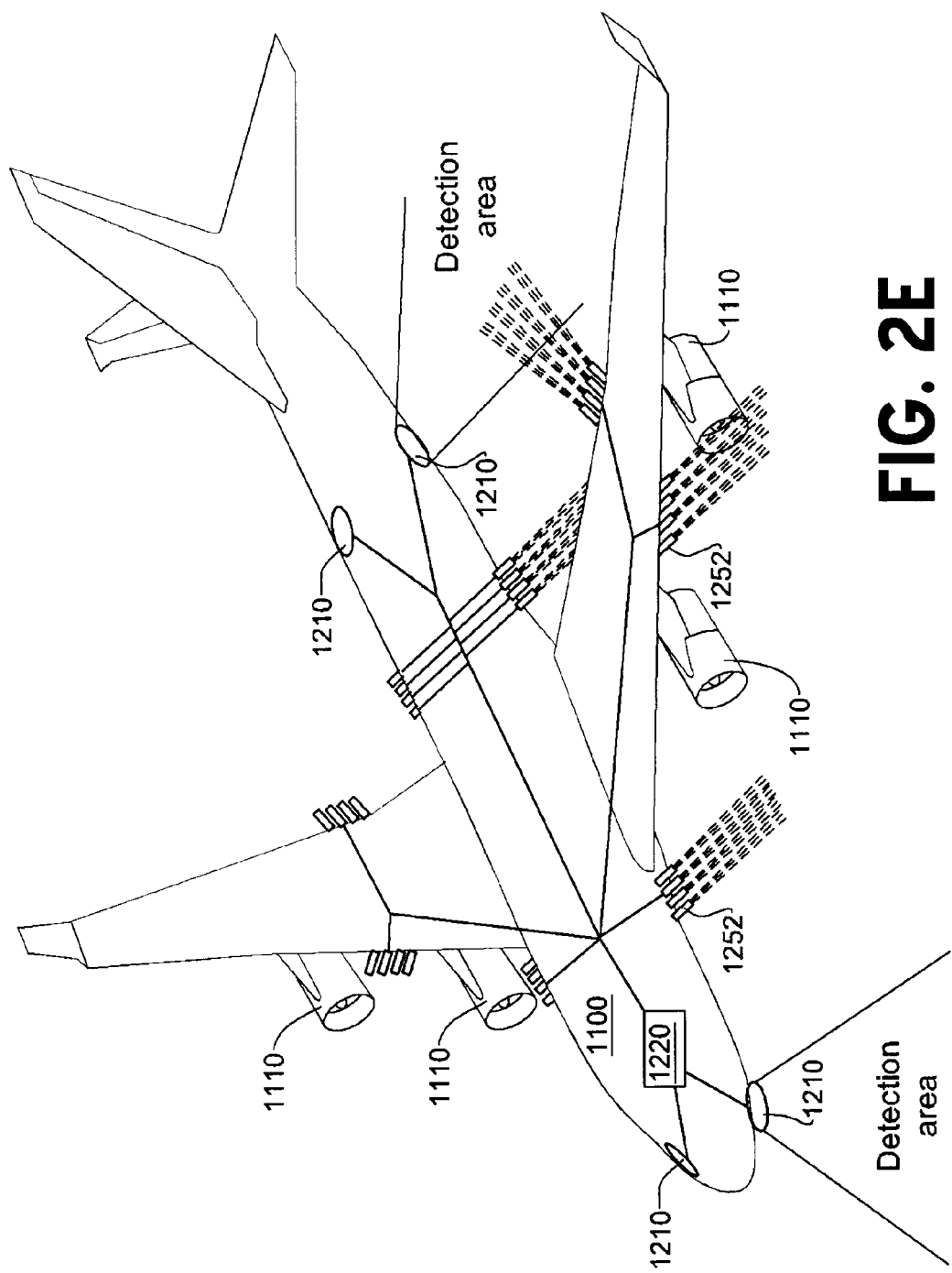
Figure 2F:
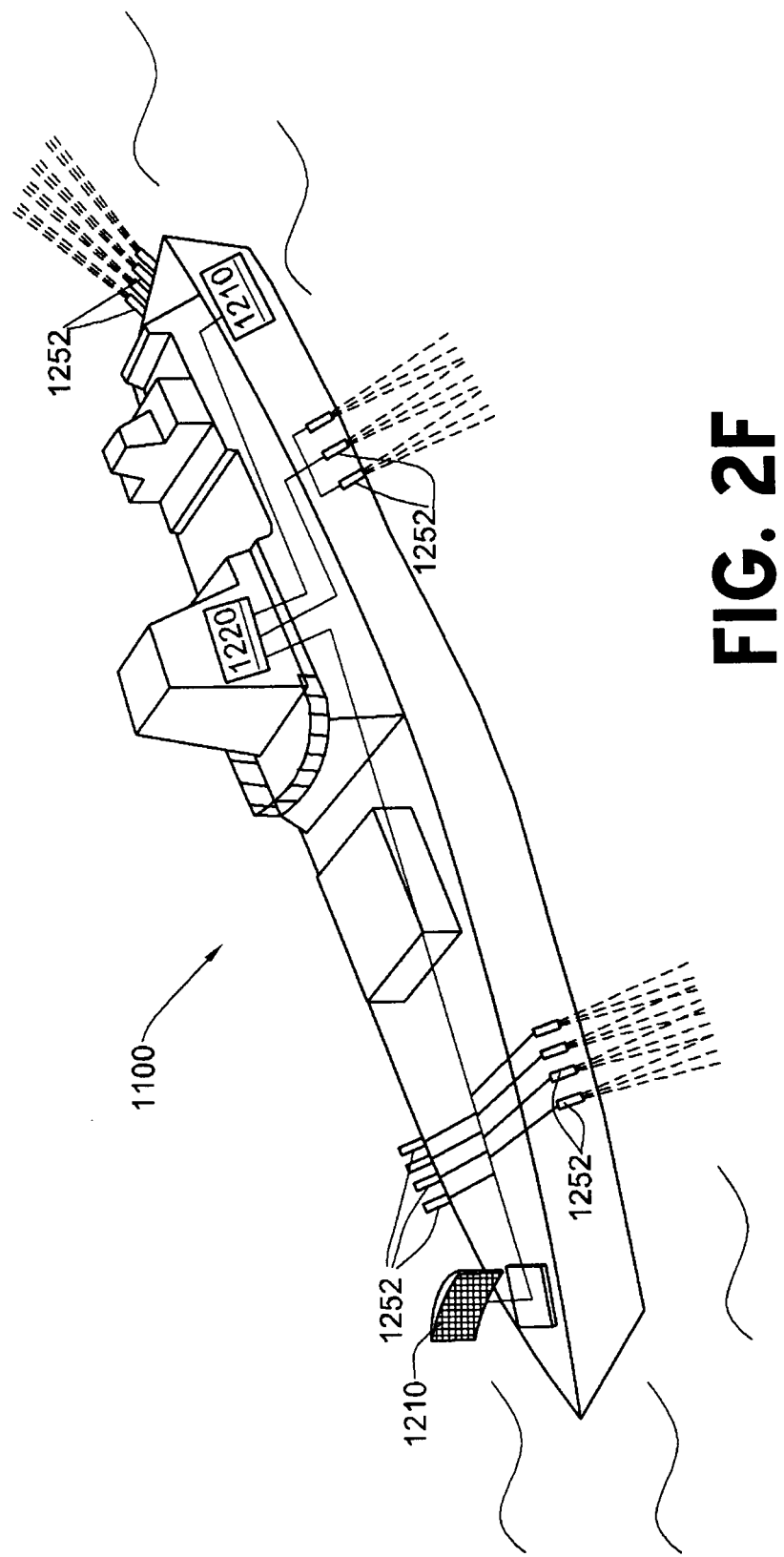

According to an embodiment of the invention, at least one nozzle 1252 of jetting system 1250 is located in a front portion of vehicle 1100. Such a configuration, examples of which are illustrated in FIGS. 2B and 2F, enables a wide range of possible jetting directions, such as forwards, to the sides, up and down, and in diagonal angles—both backwards and forwards. Naturally, not all of these options are necessarily implemented in every such an embodiment of the invention.

The proximity of the at least one nozzle 1252 to the front of vehicle 1100 in such a configuration may differ in different implementations, and may depend on various factors (such as the one discussed above in relation to the general positioning of jetting system components). For example, according to an embodiment of the invention, a distance between a frontmost part of vehicle 1100 and a nozzle of jetting system 1250 used for the jetting of the high pressure jet is shorter than 5% of a length of vehicle 1100 (wherein this length is measured between the frontmost part of vehicle 1100, denoted A in FIG. 2D, and a rearmost part of vehicle 1100, denoted B in FIG. 2D). Thus, in a 73 meters long Airbus A380-800 vehicle, such a nozzle may be located within some 3.5m from the frontmost part of the vehicle 1100. It is noted that this distance may be measured as a projection on a longitudinal axis of the vehicle connecting a front end of the vehicle and a rear end of vehicle 1100. In other embodiments of the invention, the frontmost nozzle 1252 of jetting system 1250 may be located at the front of vehicle 1100, but somewhat more distanced from the frontmost part—e.g. at a distance less than 10% (or 15%) than the frontmost part of vehicle 1100. A person who is of skill in the art would understand that those numbers are given by way of example only, and that the actual numbers have to be adjusted for the implemented system.

According to an embodiment of the invention, at least one nozzle 1252 of jetting system 1250 is located in a back portion of vehicle 1100. Such a configuration enables a wide range of possible jetting directions, such as forwards, to the sides, up and down, and in diagonal angles—both backwards and forwards. Naturally, not all of these options are necessarily implemented in every such an embodiment of the invention.

The proximity of the at least one nozzle 1252 to the back of vehicle 1100 in such a configuration may differ in different implementations, and may depend on various factors (such as the one discussed above in relation to the general positioning of jetting system components). For example, according to an embodiment of the invention, a distance between a rearmost part of vehicle 1100 and a nozzle of jetting system 1250 used for the jetting of the high pressure jet is shorter than 5% of a length of vehicle 1100 (wherein this length is measured between the frontmost part of vehicle 1100 and a rearmost part of vehicle 1100). Thus, for example, in a 150 meters destroyer warship, such a nozzle may be located within some 7.5 m from the rearmost part of the ship. It should be noted that that distance may be measured as a projection on a longitudinal axis of the vehicle connecting a front end of the vehicle and a rear end of vehicle 1100. In other embodiments of the invention, the rear most nozzle 1252 of jetting system 1250 may be located in a back portion of vehicle 1100, but somewhat more distanced from the rearmost part—e.g. at a distance shorter than 10% (or 15%) than the rearmost part of vehicle 1100.

According to an embodiment of the invention, at least one nozzle 1252 of jetting system 1250 is located substantially near a component of vehicle 1100 that is prone to serious damage if struck by a missile (or to which protection is otherwise desired)—such as an engine 1110. Such a configuration, an example of which is illustrated in FIG. 2D, enables jetting of a high pressure jet toward missiles that come dangerously close to such a component of vehicle 1100. It should be noted that in some embodiments of the invention such a nozzle 1252 may be used to jet high pressure jets to protect more than a single sensitive component (e.g. protecting two adjacent engines 1110).

For example, according to an embodiment of the invention in which vehicle 1100 is an airplane, a distance between a wing of the aircraft and a nozzle 1252 used for the jetting of the high pressure jet is shorter than a distance of the nozzle from the rearmost part of vehicle 1100. Alternatively, said distance may be measured from an engine 1110 of vehicle 1100 (rather than from the wing).

For example, such one or more nozzles 1252 may be located on the engine structure of the engine 1110 itself, on the wing or other structure that carries that engine 1110 and/or on a body of vehicle 1100, in proximity to a connection of the wing and the body. The jetting direction of such nozzles 1252 may vary in different embodiments of the invention (and even between different nozzles 1252 of a single implementation)—e.g. substantially forward, substantially to the side, substantially upwards or downwards, or diagonally.

However, in such a case in which one or more nozzles 1252 are located in proximity to an engine 1110, a direction of the jet jetted from that nozzle 1252 may cross a space located behind the engine, the direction from which at least some types of missiles are expected to strike the engine 1110. It is noted that a direction of a jet that is jetted from any given nozzle 1252 may be perpendicular to a plane of an aperture of that nozzle 1252 (if at all planar), but this is not necessarily so.

As aforementioned, the distance from a vehicle component of a nozzle 1252 that is designed to assist in protecting the component may be relatively small in relation to the size of the entire vehicle 1100. For example, a distance between such a component (e.g. an engine 1110) of vehicle 1100 and a nozzle 1252 used for the jetting of the high pressure jet (or, according to another form of characterization, a projection of that distance on a longitudinal axis of vehicle 1100 connecting a front end of vehicle 1100 and a rear end of vehicle 1100 is smaller than 5% of the length of vehicle 1100 which is measured—as aforementioned—between the front and rear ends of vehicle 1100. Other relations may also apply in some embodiments of the invention (e.g. less than 1% of the length, less than 3% of the length, less than 10% of the length), or be measured in relation to other characteristic dimensions of vehicle 1100 (e.g. less than 5% of the width of vehicle 1100).

It would be clear to a person who is of skill in the art that nozzles 1252 in different configurations may be positioned in different directions with respect to a longitudinal axis of vehicle 1100 (e.g. in order to more effectively cross an imaginary danger area in which missiles may seriously endanger the vehicle).

According to an embodiment of the invention, an angle between a jetting direction in which jetting system 1250 (such as by at least one nozzle 1252 of which) is operable to jet the high pressure jet (or a high pressure jet, e.g. if system 1200 may jet more than one high pressure jet) and a progression direction of vehicle 1100 is between 80° and 100°. This angle may also be measured with respect to the longitudinal axis of vehicle 1100. It is noted that in such a scenario, an angle between the jetting direction and a horizontal axis perpendicular to the longitudinal axis need not be very large (unless protection of specific components such as the tail in an airplane is required). A person who is of skill in the art would understand that those numbers are given by way of example only, and that the actual numbers have to be adjusted for the implemented system.

It should be noted that the direction in which the high pressure jet is jetted is not necessarily a direction in which the high pressure jet progresses in its entire course. For example, drag effects of ambient atmosphere and/or wind may result in bending of the high pressure jet during its progression.

It should be noted that measurement of the angle with respect to the longitudinal axis or to the progression direction of vehicle 1100 may matter in some situations (e.g. in strong winds, in strong currents, etc., wherein such directions may somewhat deviate one from the other).

In the configuration discussed above, the jetting direction may largely be regarded as more-or-less perpendicular to the progression direction of vehicle 1100 (or, respectively, to its longitudinal axis). In another configuration, an angle between a jetting direction in which jetting system 1250 is operable to jet the high pressure jet and a progression direction of vehicle 1100 (or, in another definition, a longitudinal axis of which) is between 175° and 185°. A person who is of skill in the art would understand that those numbers are given by way of example only, and that the actual numbers have to be adjusted for the implemented system.

It will be clear to a person who is skilled in the art that any other intermediary jetting direction (not substantially perpendicular to the longitudinal axis and not substantially parallel to which, but rather substantially diagonal) may also be implemented, e.g. as exemplified below. In yet other configurations, an angle between the jetting direction (or its countering direction) of any one of the one or more jets jetted by jetting system 1250 may be different—e.g. between 5°-10°, between 10°-20°, between 20°-30°, between 30°-40°, between 40°-50°, between 50°-60°, between 60°-70°, between 70°-80°, and any combination thereof.

However, jetting by any one nozzle 1252 may not necessarily be in a direction set during manufacture or even on initiation of motion of the vehicle. In some embodiments of the invention, jetting direction of the jet jetted from any one or more nozzles 1252 may be determined and set during operation—and even in response to the detection data.

According to an embodiment of the invention, processor 1220 is further configured to determine a desired jetting direction in response to the result of the analysis, wherein a configuration of at least one nozzle 1252 is modified prior to the jetting of the high pressure jet in response to the desired jetting direction.

Modification of the jetting direction in response to the desired jetting direction determined by processor 1220 may be implemented in different ways in different embodiments of the invention. For example, at least one component of jetting system 1250 may be mechanically pivoted or otherwise turned, a selection between various nozzles or nozzle apertures (which may be interchangeable) may be made, a shape of an aperture of at least one nozzle may be made, an additional force (apart from the one used for the jetting) may be applied on the jet after it leaves the nozzle by another component of jetting system 1250 (e.g. by channeling air through which vehicle 1100 moves).

It should be noted that there be many technical alternatives for jetting the high pressure jet, many of which are known in the art and are readily implementable by a person who is of skill in the art. For example, the jetting may be facilitated by utilization of pressured gas, by utilization of one or more types of pumps, by mechanical pressure applied to the water to be jetted, and so forth.

In some embodiments of the invention, jetting system 1250 may include one or more jetting system containers of water (denoted 1254) operable to store water that will be used for the jetting when required. It will be understood by a person who is of skill in the art that equivalent containers that may store different types of fluids may also be implemented, where such other fluids (especially liquids) are utilized.

According to an embodiment of the invention, jetting system 1250 is operable to jet onto the missile the high pressure jet that includes water (or equivalent fluid, as discussed above) from the at least one jetting system container 1254. Throughout the following disclosure it is noted that in other embodiments of the invention, fluids other than water may be implemented, instead of or in addition to water. It is should further be noted that the container 1254 may be a container of vehicle 1100 or of another sub-system thereof, e.g. in case that the fluid used for jetting is stored in vehicle 1100 regardless of system 1200 (this is especially true for water, but it should be noted that a variety of other fluids are also stored and routinely used in many vehicle functions, and some of such fluids may be utilized in other embodiments of the invention).

Even if not sharing the same containers, and/or if the jetting system requires dedicated containers for its operation, one or more of the jetting system containers 1254 and at least one external container (e.g. water containers routinely installed in commercial vehicles, in ships, etc.) may still be connected by a hydraulic connection that permits transmission of the contained fluid (e.g. water) between the internal and the external containers.

Referring to FIG. 3, in which a detailed view of containers of jetting system 1240 is exemplified according to an embodiment of the invention, it should be noted that according to an embodiment of the invention, at least one jetting system container 1254 of water is hydraulically connected to a fresh water supply (denoted 1130) of vehicle 1110 for at least a first period between a setting off of the vehicle (e.g. takeoff for an aircraft, departure of a ship, etc.) to the triggering of the jetting system. It should be noted that the connection to the fresh water supply may be a connection to a container 1132 of fresh water supply 1130, to a pipe of fresh water supply 1130, or to another component which contains water for at least a part of the first period.

It should further be noted that the first period may last for different whiles in different implementations. For example, the hydraulic connection may be a fixed hydraulic connection, may be a hydraulic connection that is only opened for one or more relatively short periods of pressure equalization, may be terminated (e.g. by way of a faucet) in response to a result of the analysis, may depend on vehicle 1100 system commands, and so on and so forth. However, according to such an embodiment of the invention, it may be opened for at least a while between the setting-off and the triggering.

It should be noted that in at least some implementations of system 1200, the hydraulic connection may be a plain connection—such as a pipe—in the sense that compression or decompression or other alteration of the pressure of water during passage in that hydraulic connection is not intentionally implemented for any substantial reason. As is exemplified below, differences of pressure between jetting system containers 1254 and fresh water supply 1130 may be implemented at a later stage—while the two are not hydraulically connected in a way that permits transference of water between the two. Yet, according to an embodiment of the invention, a difference between water pressure in any of the at least one jetting system container 1254 and water pressure of the fresh water supply 1130 is less than 5% at times of such a hydraulic connection.

It should be noted that the term "hydraulic system of the vehicle" or like terms as used in this document do not refer particularly to hydraulic systems that utilize fluid power of pressurized hydraulic fluid to drive mechanical components such as hydraulic motors, brakes of the vehicle and the like. Such terms rather refer to fluidal systems in a wider sense of "consisting of or pertaining to fluids". Likewise, the term "hydraulic connection", or like terms, refers to any connection that enables passage of fluid, regardless of whether this connection is also utilized for transmission of power. Hydraulic connection as used herein may be applied, by way of example, to any communicating vessels (or container) of an atmospheric pressure fresh water system of vehicle 1130.

It should be noted that in some embodiments, dedicated jetting system containers 1254 may be implemented, that store water (or other fluid) without any hydraulic connection to hydraulic systems of vehicle 1100 (such as fresh water system 1130). One possible reason to prefer the hydraulic connection to the vehicle hydraulic system is that none or less dedicated fluid is required—which reduces weight (which is an important factor in aviation) and possibly even reduces the volume of jetting system 1250 (e.g. if a single container 1254 may be filled from the fresh water system 1130 more than once).

Implementation of multiple jetting system containers 1254 may be desirable for a variety of reasons. For example, different jetting system containers 1254 may be used by different nozzles 1252, especially if the latter are located at substantially remote ports of vehicle 1100. Another reason may be that in some embodiments of the invention, each jetting system container 1254 may be used for the jetting of only a single jet, and if jetting of multiple jets is desired, multiple jetting system containers 1254 should be implemented. Other reasons may lead to such a configuration as well, as previously expressed.

According to an embodiment of the invention, the jetting of fluid (e.g. water) from one or more jetting system containers 1254 is achieved using high pressure gas. According to an embodiment of the invention, each of the at least one jetting system container 1254 is connected to a corresponding high pressure tank 1256 that contains high pressured gas. It is noted that the connection is a connection that permits (or selectively permits—at some times) transmission of gas from the high pressure tank 1256 to the corresponding jetting system container 1254—but not necessarily enables transmission of material in the other direction (e.g. due to the substantial pressure difference). The high pressure gas, according to such an embodiment of the invention, may provide at least some (and possibly all, or substantially all) of the pressure required for the jetting of a high pressure jet that includes water from the respective jetting system container 1254.

The connection between containers 1254 and gas tanks 1256 may be on a one-to-one basis, wherein each container 1254 is connected to a single gas tank 1256 and vice versa, but this is not necessarily so. In some embodiments of the invention multiple gas tanks 1256 would be connected to a single container 1254 (e.g. if a lot of high pressure gas is required) while in some embodiments multiple containers 1254 may be connected to a single gas tank 1256 (e.g. if jetting from multiple containers—such as from nozzles located in different parts of vehicle 1100—is desired). Combinations of these two configurations may also be implemented.

The pressure of gas in the one or more gas tanks 1256 may vary between different embodiments of the invention. For example, according to an embodiment of the invention, each high pressure tank 1256 may contain gas at a pressure of 9,000 to 10,000 pounds per square inch (PSI). According to an embodiment of the invention, at least one of the one or more high pressure gas tanks 1256 can contain high pressure gas at a pressure that exceeds 1,000 pounds per square inch (PSI). It will be clear to a person who is of skill in the art that other ranges of pressure (e.g. 3,000-5000 PSI, 5000-9,000 PSI, etc.) may also be implemented, depending on other parameters of system 1200 and vehicle 1100, as well as on characterizations of operational need (e.g. required effective distance for a jet, its duration, and so forth).

A note should be made to safety consideration. Storage of gas in such high pressures onboard a civilian vehicle may be regarded as somewhat dangerous. There are various types of precaution measures that may be implemented in order to reduce such danger, many of which are known in the art. For example, the gas tank 1256 itself may be a gas tank that does not explode under excessively high pressure, but rather cracks and allows the gas to be released in a controlled fashion (whether in gaseous form or in the form of liquid). Another exemplary means of precaution is positioning the high pressure tanks 1256 in locations in which an undesirable malfunctioning of such a tank would cause minimal damage (e.g. away from critical components of vehicle 1100 and from people onboard) and/or in locations where environmental conditions are safer for storage of high pressure gas (e.g. in cold locations, in areas that suffer less mechanical impact, etc.).

While these and other precautionary means may be implemented, it should be noted that provisioning of high pressure fluids (and especially gas) is alternatively enabled using pumps and/or compressors rather than high pressure gas tanks (or for pressuring gas in tanks upon need). It should therefore be noted that wherever high pressure tanks 1256 are discussed, alternative implementations of utilizing one or more pumps or compressors for pressurizing of fluid to be used instead of the equivalent gas from the high pressure tanks 1256, may be considered.

Other means other than high-pressure tasks 1256 storing high-pressure gas may also be used for the jetting of fluid using high pressure gas. According to an embodiment of the invention, gas may be pressured onboard the vehicle, e.g. by a compressor, by utilization of explosives, etc. For example, when a jetting is triggered, a signal may be sent to a high pressure gas provisioning unit of jetting system 250, wherein an igniter would start a rapid chemical reaction generating high pressure gas (e.g. nitrogen N2). The reaction may include ignition of energetic propellant or an explosive material.

The ignition of the chemical reaction may be accompanied by breaching a barrier that separates (prior to its breaching) between the high pressure gas provisioning unit to the corresponding jetting system container 1254—but such a barrier is not necessarily implemented. The gas so pressured, according to such an embodiment of the invention, may provide at least some (and possibly all, or substantially all) of the pressure required for the jetting of a high pressure jet that includes water from the respective jetting system container 1254.

Referring again to the connection between any of the jetting system containers 1254 and the gas tanks 1256, it should be noted that according to an embodiment of the invention, any gas-transmission-permitting connection between each of the at least one jetting system container 1254 and its corresponding high pressure tank 1256 (i.e. the tank 1256 connected to said container 1254, e.g. as described above) is blocked (for example by faucet or explosible plug 266) during the first period (which is the period during at least which the water permitting connection between that container 1254 and the fresh water system 1130 permits transmission of water—if such connection is indeed implemented).

Generally, in some embodiments of the invention, transmission of high pressure gas to any container 1254 is prevented while the latter is hydraulically connected to the fresh water system 1130 of vehicle 1100 (or to another hydraulic system thereof), e.g. in order to protect the fresh water system 1130 from the high pressure that it is not designed for, and in order to concentrate the high pressure towards exiting via a connected nozzle 1252 of jetting system 1250 and not to be wasted via undesired and ineffective expansion to spaces of said vehicle's hydraulic system.

In some embodiments of the invention, any hydraulic connection between each of the at least one jetting system container 1254 and a fresh water supply 1130 of vehicle 1100 is blocked prior to the jetting of the high pressure jet and during the jetting. Such a hydraulic connection between at least one jetting system container 1254 and the fresh water supply 1130 may be, by way of example, a faucet 264.

According to an embodiment of the invention, such a blocked connection may be selectively opened in response to a command issued by processor 1220. Such a command may be issued directly before jetting—e.g. in response to analysis of the detection information that indicates detection of the missile, and may also be issued regardless of such detection (and even substantially before it), e.g. after the jetting system containers 1256 are sufficiently filled. It should be noted that in some embodiments of the invention such blocking may be reinstituted, but this is not necessarily so. Additionally, in some embodiments in which multiple high pressure tanks 1256 are connected to one (or more) jetting system containers 1256—it should be noted that not all of these connections are necessarily selectively opened concurrently, and that some connections may be blocked while others are opened.

Once the blocking between a high pressure gas tank and a respective container 1254 is opened, the pressure in that container 1254 increases substantially. Conveniently, such pressure is maintained (possibly even increased, if connecting to additional tanks 1256) prior to the jetting, e.g. by having no connection permitting transmission of fluid to large spaces of lower pressure (especially vehicle spaces or open air, which are usually substantially of atmospheric pressure).

In such an embodiment of the invention, it will be clear to a person who is of skill in the art that aperture a nozzle 1252 of jetting system 1250 (or aperture a connection, such as optional faucet 1262, between the nozzle 1252 and the container 1254 to which it is connected)—having its external side located at substantially lower pressure (e.g. atmospheric pressure)—would result in jetting of a high pressure jet from that nozzle (given that an aperture of the nozzle is not exceedingly large). Sizes of apertures of nozzles 1252 in various embodiments of system 1200 may vary, but are usually less than 1 cm or 2 cm, and may be effectively sized as a few millimeter (mm) apertures, e.g. 1 mm, 2 mm, 3 mm, etc. According to an embodiment of the invention, all the apertures of nozzles 1252 that are used for jetting high pressure jets by jetting system 1250 are smaller in their longest dimension than 5 mm. According to an embodiment of the invention, an aperture size of any nozzle that is used by jetting system 1250 for the jetting of the high pressure jet is smaller than 4 mm.

It should be noted that aperture size of at least one of the nozzles may be substantially larger than 4 mm. By way of example, according to an embodiment of the invention, the shape of an aperture of such a nozzle may be of elongated shape, e.g. having a length of over 1 cm, and a width of less than 1 mm. in another example, a size of the aperture of the nozzle may be substantially larger than 4 mm (e.g. diameter of 1 cm, a 5×10 mm² rectangle), wherein the aperture may be selectively shut to different degrees by a matching shutter.

In an exemplary implementation, one or more pipes may be located around the vehicle (or along a part of its periphery, wherein in the pipe several slits serve as nozzles. For example, each such slit may be several millimeters wide and several centimeters long (even though other sizes may also be implemented). Each of those slits may be controlled independently or as a group. According to an embodiment of the invention, all of the slits on a single such pipe operate together for jetting of high pressure jets—e.g. for providing peripheral protection to the vehicle (e.g. task) against missiles at multiple sides concurrently.

According to various embodiments of the invention, processor 1220 is further configured to determine activation parameters for jetting system 1250 (e.g. in response to the result of the analysis), wherein a shape of an aperture of at least one nozzle 1252 is modified prior to the jetting of the high pressure jet in response to the activation parameters.

Modification of shape of the aperture of the at least one nozzle in response to the activation parameters determined by processor 1220 may be implemented in different ways in different embodiments of the invention. For example, at least one component of jetting system 1250 may be mechanically pivoted, turned, moved, etc. It should be noted that the modification of such aperture shape may be carried out by actually modifying the shape, and may also be applied by modifying or replacing an external component (e.g. having an aperture that is narrower than that of the respective nozzle 1252 in at least one dimension) used for regulating the flow of fluid out of that nozzle 1252. Such a component may be, by way of example, an external shutter.

Modification of the shape of the aperture of a nozzle 1252 may affect the shape and strength of a high pressure jet that is jetted solely from such a nozzle 1252, and may also change the shape, power, etc. of a high pressure jet that is concurrently jetted from a group of nozzles 1252. When jetting from a group including more than one nozzle, usually a transitory jet is jetted from each of the nozzles 1252 of the group, wherein the transitory jets are joined along the course of the jetting to a single jet.

The nozzles 1252 of the group used for the jetting may be substantially similar to each other and/or arranged symmetrically, but may also be different from each other and/or arranged asymmetrically. Asymmetrical configuration of the multiple nozzles 1252 of the group, and/or difference in shape of aperture (or equivalent internal configuration) may be used for creating a jet of desired properties, and especially, in some embodiments of the invention, having asymmetrical behavior. As will be exemplified below, such configuration may be used in some embodiments of the invention for affecting a jetting direction of the high pressure jet.

It should be noted that instead of modifying a shape of the aperture of the nozzle 1252, equivalent modification may be applied to internal components of such a nozzle 1252, which may achieve equivalent effects on the flowing of fluid out of that nozzle 1252.

Modification of a shape of the aperture of such a nozzle 1252 and/or of its internal structure may be implemented in many ways. In an example, according to an embodiment of the invention, one or more nozzles 1252 of jetting system 1250 may be a valve as described in Israeli patent application serial number IL208128 filed on Sep. 14, 2010, and which is incorporated herein in its entirety by reference.

As noted above, in some embodiments of the invention—and for various reasons—a single jet may be designed to be jetted from multiple nozzles 1252 (connected to a single container 1254, or to more than one container). In such embodiments of the invention (though not necessarily in such embodiments), the aperture of nozzles 1252 in jetting system 1250 may be submillimetric.

As aforementioned, an asymmetric configuration of multiple nozzles 1252 used for the jetting of a single high pressure jet, and/or difference in the geometrical characteristics of such nozzles 1252 may be used in some embodiments of the invention for affecting a jetting direction of the high pressure jet. In some of the embodiments in which the jetting system 1250 is operable to jet the high pressure jet from a group including multiple nozzles 1252, configuration of at least one nozzle of the group is modified prior to the jetting of the high pressure jet in response to the desired jetting direction.

According to such embodiments of the invention, the shape of the aperture of at least one nozzle 1252 of the group may be modified to a different shape than the shape of the aperture of at least one other nozzle 1252 of the group, in response to the desired direction. Other configuration modification which may achieve affecting a jetting direction of the high pressure jet is controlling different pressures of the jetting through the different nozzles 1252 of the group (some of which may even not be used for jetting of some jets), controlling a jetting direction of one or more of the nozzles 1252 of the group, and so forth. It should be noted that the modification of the shape of the aperture of each of the nozzles 1252 (or other geometric or other internal configuration thereof) may be used for modifying the jetting pressure of these nozzles, but this may not be the only effect.

Figure 6A:
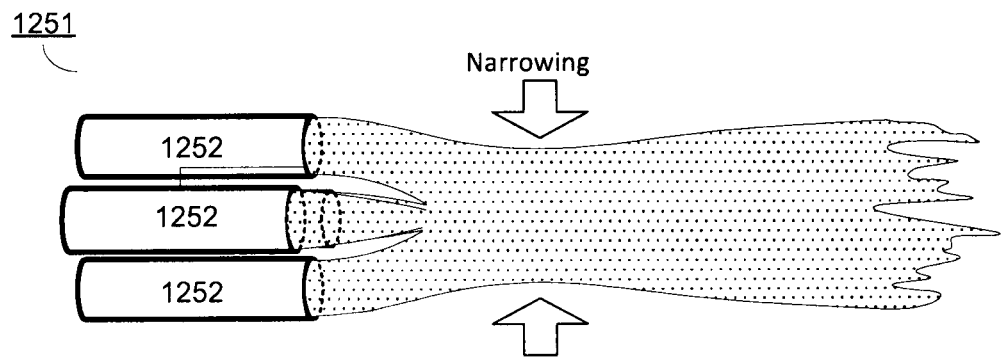
FIGS. 6A and 6B illustrate a group of nozzles 1252 (collectively denoted 1251) which together jet a single high pressure jet, according to an embodiment of the invention.
Figure 6B:
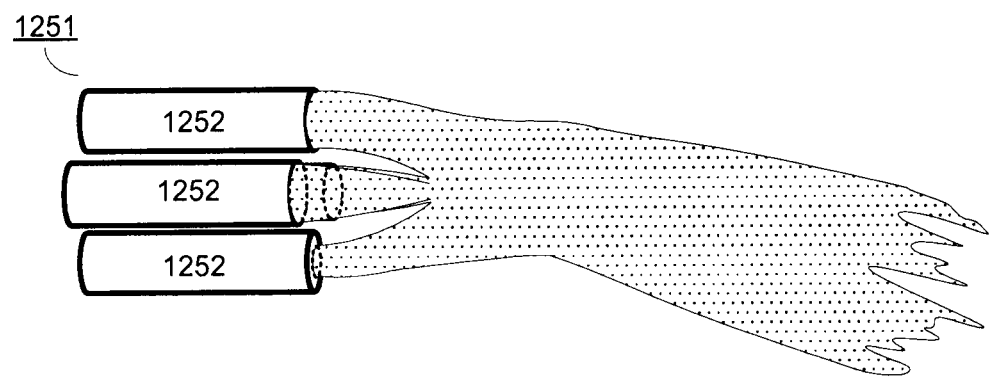

FIGS. 6A and 6B illustrate a group of nozzles 1252 (collectively denoted 1251) which together jet a single high pressure jet, according to an embodiment of the invention. As can be seen in FIG. 6A, when all the nozzles 1252 of the group 1251 jet transitory jets that are substantially identical, the transitory jets are combined to the high pressure jet whose jetting direction may be substantially parallel to an axis of symmetry around which the nozzles are arranged.

As can be seen in FIG. 6B, when one or more of the nozzles 1252 of the group 1251 jet a transitory jet whose shape is different than the shape of at least one other transitory jet jetted by another nozzle 1252 (e.g. due to a different shape of the aperture of that nozzle 1252, as illustrated), the transitory jets may be combined to form the high pressure jet whose jetting direction may be slanted with respect to such an axis of symmetry. Clearly, the jetting direction may not be the only parameter of the high pressure jet that is controllable by controlling of the shape of the aperture (or other geometric features) of the nozzles 1252 of such a group of nozzles 1251.

Referring again to FIG. 6A, as exemplified in this drawing, when a single high pressure jet is jetted from a group of nozzles 1251, the high pressure jet is not always uniform, and may have a local narrowing along its course (denoted "Narrowing" in FIG. 6A). The distance of the narrowing from the different nozzles 1252 of group 1251 (as well as the extent of the narrowing) depends on various factors, such as a shape of the aperture of each of the nozzles 1252 of the group 1251, the pressure of the different transitory jets, and so forth. Therefore, control of these factors may be used to control the distance of the narrowing from the nozzles.

According to an embodiment of the invention, processor 1220 may be configured to determine the activation parameters that include an estimated distance for hitting the missile, wherein the jetting system is operable to control the configuration of multiple nozzles of the group for controlling a narrowing location of a narrowing of the high pressure jet in response to the estimated distance. It is noted that the kinetic energy of the high pressure jet may be focused to a smaller area in the narrowing, and thus may have more impact on the missile when hit by the high pressure jet.

The size of nozzle apertures is but one of the factors which affects the effective distance of the jetted high pressure jet. Another factor is the number of the one or more nozzles 1252 participating in the jetting of this jet, as well as nozzle geometry of such one or more nozzles 1252 (especially of their apertures, but not necessarily exclusively). Other factors that substantially influence the effective distance of the jet is the pressure of the fluid jetted, and the hydraulic efficiency of the hydraulic system used for transmission of fluid from the container 1254 to the nozzle 1256. Other substantial factors include, among others, fluidal properties of the jetted fluid such as viscosity, surface tension, density, etc. as well as dynamic parameters of the vehicle, such as velocity. It will be clear to a person who is of skill in the art that this list does not include other possible substantial influencing factors, and is only presented for illustrative purposes.

It is also clear that the effective distance of a high pressure jet may be measured in different ways. The effectiveness of the jet primarily depends on what is its desired effect—which may be different in different embodiments of the invention. The principal goal of reducing damage by missiles to vehicle 1100 may be achieved using one or more high pressure jets in various ways, some of which are exemplified below:

Using the jet for forcing the missile 20 away, either preventing a collision of missile 20 and vehicle 1100, or resulting in collision in a less sensitive part of vehicle 1100.

Smashing missile 20 with the jet—resulting in multiple pieces of substantially smaller size (compared to the previously whole missile) which are far less hazardous to the vehicle.

Diverting missile 20 from its original course, either preventing a collision of missile 20 and vehicle 1100, or resulting in collision in a less sensitive part of vehicle 1100. Such diversion may be achieved, by way of example, by rotating the missile 20 around its center of mass by jetting onto a location in the missile relatively remote from its center of mass.

Any combination of the above effects.

According to an embodiment of the invention, jetting system 1250 is operable to jet the high pressure jet to an effective distance of at least 3.5 meters (3.5 m) from at least one nozzle 1252 out of which the high pressure jet is jetted. Other effective distances may be defined for different scenarios and implemented systems 1200, e.g. 2 m, 5 m, 7 m, 10 m, 15 m, 20 m, and even above, especially for relatively larger vehicles.

As aforementioned, the effective distance may be defined in various ways—e.g. depending on the component of vehicle 1100 that is protected by a jet. For example, according to one definition, hit of the missile by the high pressure jet at a distance smaller than the effective distance, results in forcing the missile away from an engine 1110 of vehicle 1100 (or, additionally or alternatively, in smashing of the missile and/or in diversion thereof).

In various embodiments of the invention and depending—among other parameters—on the characteristics of the high pressure jet—the hitting of the missile (e.g. weighing over 5 Kg) may result in causing a displacement of the missile by some 4 m or more away from a body of the vehicle.

According to another group of definitions, the effective distance may be defined by hydrodynamic characteristics of the high pressure jet. For example, according to an embodiment of the invention, at any distance smaller than the effective distance, water velocity (or fluid velocity if other fluid is used) in a core of the high pressure jet is higher than 50 m·s$^{-1}$ (or other velocity threshold in other implementations, e.g. 30 m·s$^{-1}$, 70 m·s$^{-1}$, 90 m·s$^{-1}$, 150 m·s$^{-1}$, etc.).

It should be noted that the core of the high pressure jet is not necessarily in its center and/or its axis of symmetry (if applicable). The core may also pertain to a locus in which most of the jetted fluid flows in the jet. In some implementations, for example, the very center of the high pressure jet (or even a locus that contains that center) may not be the part of the high pressure jet in which the flow is most vibrant (in at least some parts along the course of the high pressure jet), in which case the core may be considered to be a locus that does not wholly contain the center of the jet.

In another example, according to an embodiment of the invention, at any distance smaller than the effective distance, water velocity (or fluid velocity if other fluid is used) in a core of the high pressure jet is about 280 m·s$^{-1}$ (e.g. between 1250 m·s$^{-1}$ and 300 m·s$^{-1}$).

Referring again to two of the aforementioned exemplary ways of reducing damage by missiles to vehicle 1100:

Using the jet for forcing the missile 20 away, either preventing a collision of missile 20 and vehicle 1100, or resulting in collision in a less sensitive part of vehicle 1100.

Diverting missile 20 from its original course, either preventing a collision of missile 20 and vehicle 1100, or resulting in collision in a less sensitive part of vehicle 1100. Such diversion may be achieved, by way of example, by rotating the missile 20 around its center of mass by jetting onto a location in the missile relatively remote from its center of mass.

Figure 7:
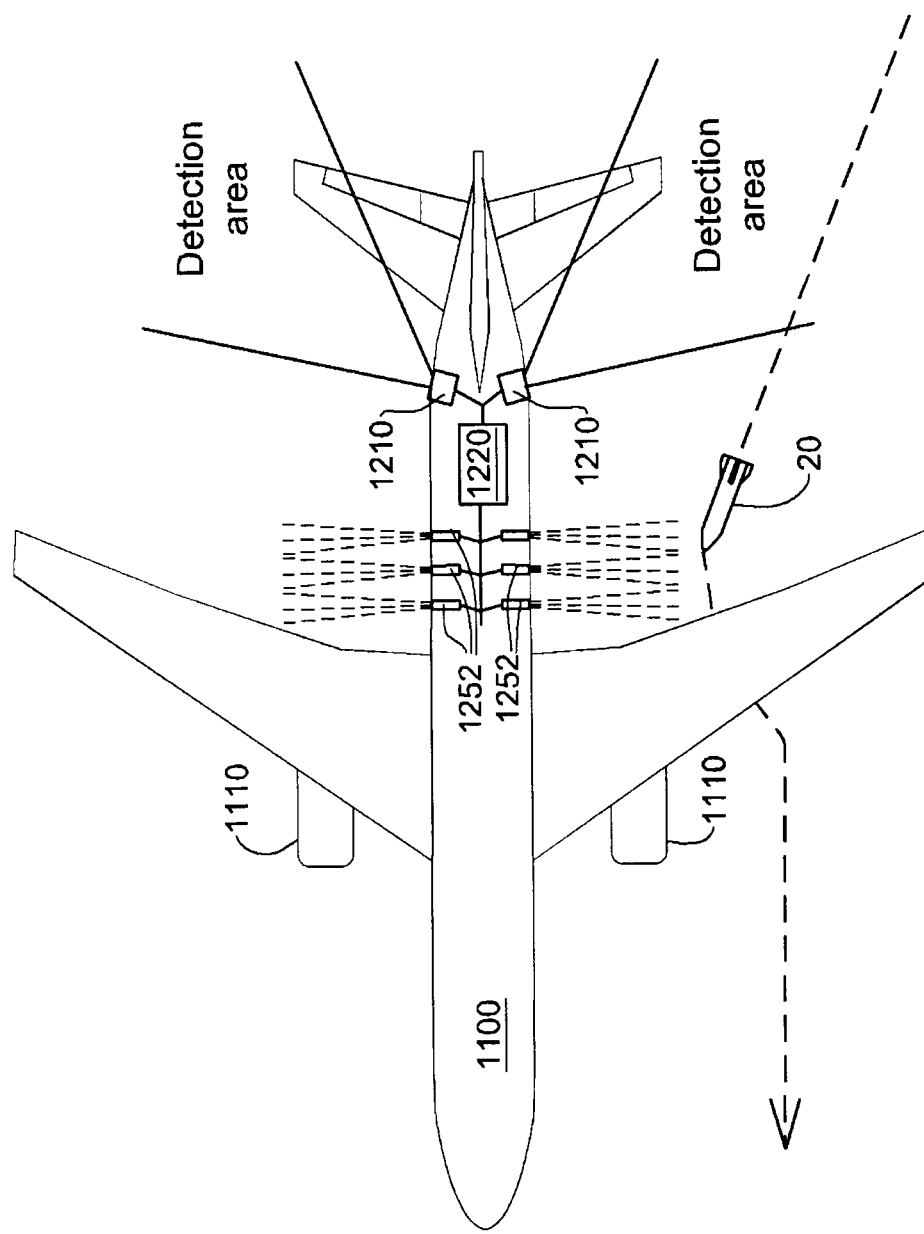
FIG. 7 illustrates jetting of a high pressure jet onto a missile, according to an embodiment of the invention.

FIG. 7 illustrates jetting of a high pressure jet onto a missile, according to an embodiment of the invention. Referring to FIG. 7, in order to force missile 20 away from vehicle 1100 (or at least from its engine 1110 or other highly vulnerable component of it) in the exemplary constellation illustrated, sufficient kinetic energy should be transmitted from the high pressure jet to the missile, increasing its momentum in a direction away from the airplane.

While some of the kinetic energy may be used for the forcing of the missile 20 away from the airplane (or other type of vehicle 1100), a part of the kinetic energy may be used for diverting the missile 20 from its target—e.g. by rotating the missile 20 about its center of mass. Since missiles are elongated bodies, hitting the missile 20 from its side (e.g. as illustrated in FIG. 7) would in many cases result in such a rotation. As the rotation normally takes place in the vicinity of the vehicle 1100, the missile 20, coming at a fast speed, would usually have no time to correct the diversion, and would miss its target.

Given the above, it should be noted that in such embodiments of the invention, stopping or slowing down of the missile 20 is not at all required or achieved by the operation of system 1200. On the contrary, in some embodiments of the invention and in some scenarios, the jetting of the high pressure jet may even cause an increase in the speed of the missile 20. Clearly, processor 1220 may be configured to determine activation parameters enabling such a jetting by the jetting system.

According to an embodiment of the invention, jetting system 1250 may be operable to jet the high pressure jet onto the missile for transferring kinetic energy to the missile. According to an embodiment of the invention, jetting system 1250 is operable to increase the kinetic energy of the missile by jetting the high pressure jet onto the missile. Clearly, processor 1220 may be configured to determine activation parameters enabling such a jetting by the jetting system.

Figure 8:
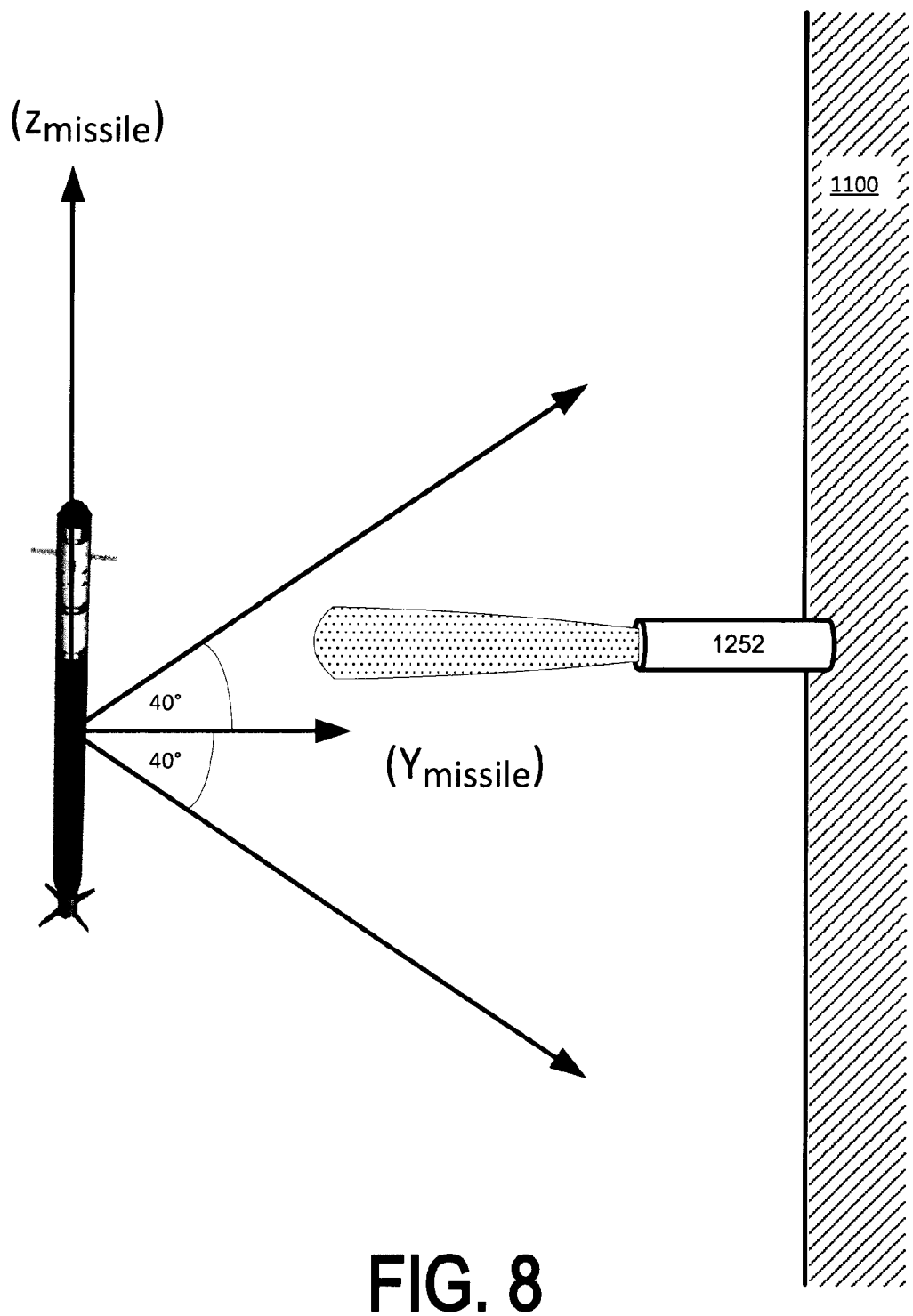
FIG. 8 illustrates a constellation of a missile and a nozzle of a jetting system at a time of its jetting, according to an embodiment of the invention.

FIG. 8 illustrates a constellation of missile 20 and nozzle 1252 of jetting system 1250 at a time of its jetting, according to an embodiment of the invention. According to an embodiment of the invention, jetting system 1250 may be operable to jet the high pressure jet onto missile 20, hitting the missile at an angle of less than 40° from an axis (denoted $Y_{missile}$) perpendicular to a progression direction of the missile (denoted $Z_{missile}$) at the time of the hit. Hitting at such angles may result in an efficient transfer of the kinetic energy of the high pressure jet to the missile 20, resulting in the forcing away of missile 20 from vehicle 1100 and/or in the diversion/rotation of missile 20.

According to an embodiment of the invention, during at least part of the time of the hitting of missile 20 with the high pressure jet, jetting system 1250 hits the missile 20 with the high pressure jet at an angle of less than 20° from the formerly denoted $Y_{missile}$ axis, and even at an angle of less than 5° (if not directly parallel to this axis).

One of the substantial parameters which may also influence the effective distance of the high pressure jet (as well as other properties of which, such as effective power, duration, etc.) is the amount of water (or other jetted fluid) jetted. According to an embodiment of the invention, jetting system 1250 is operable to jet the high pressure jet that consumes between 30 and 150 liters of water (or whichever fluid, especially liquid, that is jetted). The amount of water consumed by jets in some embodiments of the invention may be from the lower part of that range (e.g. 30-50 liters) while others may be from a middle or higher part of that range (e.g. 50-100 or 100-150 liters). It will be clear to a person who is of skill in the art that in some implementations, the amount of water consumed for the jetting of a high pressure jet may exceed 150 liters of water, or be less than 30 liters. For example, if the vehicle is a ground vehicle such as a tank or a truck, or a naval vehicle such as a ship, the weight of the fluid is less of a problem, and the amount of fluid consumed in the jetting of each high pressure jets may be measured in hundreds of liters. A person who is of skill in the art would understand that those numbers are given by way of example only, and that the actual numbers have to be adjusted for the implemented system.

Clearly, different jets that are jetted by a single jetting system 1250 do not necessarily consume a uniform amount of water—e.g. resulting from a determination by processor 1220, as a result of different geometry or mechanical characteristics of different portions of the jetting system (e.g. different types of nozzles) or fluctuating temporary state of the system (e.g. the amount of water available in the fresh water system 1130).

Also—not all the water consumed for the jetting of a high pressure jet may actually constitute part of that jet (e.g. due to losses), and the jet may also include material apart from the water consumed (e.g. pressurized gas, added polymers, etc.).

In embodiments of the invention in which the system 1200 is mounted on an airplane or a ground vehicle, it should be noted that water (or equivalent jetting liquids) is a resource that may be carried in very limited quantities, due to its substantial weight.

A duration of each of the at least one high pressure jet is also determined by a wide variety of factors, such as those discussed above (e.g. pressure of the pressurized gas, amount of fluid jetted, geometry of nozzles), and various durations may be implemented in various embodiments of the invention.

For example, according to an embodiment of the invention any high pressure jet that is jetted by jetting system 1250 is jetted for an effective duration of less than 20 milliseconds. Similarly to the effective distance of the jet, it is clear that the effective duration of a high pressure jet may be measured in different ways. The duration of the high pressure jet hitting the missile 20 may be less than the effective time, e.g. 7 milliseconds. The duration of the high pressure jet hitting the missile 20 may be less than 20 milliseconds, and may be less than 50 milliseconds. Other times, possibly significantly longer, may also be implemented. However, at least in embodiments of the invention in which missile 20 is hit primarily from its side, the high velocity of the missile leaves a very short window (e.g. within the time frames indicated above) in which the missile may at all be hit by a non-rotating jet.

As noted above, the effectiveness of the jet primarily depends on what is its desired effect—which may be different in different embodiments of the invention. In an example, the effective duration of a jetting may be defined as duration in which water velocity (or velocity of equivalent fluid used for the jetting) in a core of the high pressure jet exceeds 50% of the highest water velocity in the core of that jetting.

However, as will be clear to a person who is of skill in the art, other definitions may also be applied. For example, another definition for the effective duration of the jet may be the time during which the jet may be used for achieving a defined goal for a desired effective distance (such as 3.5 m). Such a definition may be, by way of example, that hitting of the missile by the high pressure jet at a distance smaller than the effective distance and during its effective duration results in forcing the missile away from an engine 1110 of vehicle 1100 (or from other identified component thereof).

As was discussed above—in some embodiments of the invention, jetting system 1250 may be operable to jet multiple high pressure jets—either for different durations and/or at least partly concurrently. Jetting of multiple jets may be used for different ends, such as jetting toward different missiles at different times, covering a wide area (e.g. by jetting a "curtain" of jets, e.g. as exemplified in FIG. 2F), for countering multiple missiles, etc. It will therefore be clear that processor 1220 may be further configured in some embodiments of the invention to determine activation parameters for multiple jetting instances of the jetting system.

As discussed above, a few examples of activation parameters that may be determined by processor 1220 in various embodiments of the invention (e.g. in response to its analysis of detection information, in response to vehicle information, in response to a condition of system 1200, and any combination thereof) are: desired direction of jetting; identity of one or more nozzles that should participate in the jetting; number and timing of multiple jets to be jetted; amount of water and/or pressure thereof for the high pressure jet; and prerequisite activities that should be performed prior to the jetting.

An example of a scenario in which processor 1220 may determine activation parameters for multiple high pressure jets is an encounter of vehicle 1100 with a group of missiles. According to an embodiment of the invention, processor 1220 may be further configured to determine the activation parameters for the multiple jetting instances in response to detection information that is received from the at least one detector 1210 and which is indicative of detection of multiple missiles at least partly concurrently.

As aforementioned, jetting of multiple jets may be implemented—if at all—at different times, but may also be carried out at least partly concurrently. According to an embodiment of the invention, jetting system 1250 is operable to concurrently jet from multiple nozzles 1252 of the jetting system multiple high pressure jets, of which at least one is jetted onto missile 20. If a curtain of jets is implemented—a configuration in which jets are jetted at least partly concurrently so that distances between the jets across an area of interest (e.g. a cross section of an imaginary cone backwards of the engine from which a missile may be expected to arrive) are sufficiently small to achieve sufficiently high probability of hitting a missile that crosses that area of interest. Clearly—the closer the jets to each other across the area of interest, the higher the probability of hitting missile 20, but the cost in terms of energy, jetted fluid and system complexity is also higher.

Utilizing such a curtain configuration reduces or diminishes the need to implement solutions for steering the jet (e.g. by steering of the nozzles 1252 themselves). It should be noted that even if a configuration suitable for a curtain solution is implemented, not necessarily all of the nozzles 1252 in such a configuration should be used in every instance of jetting (thus achieving the widest curtain possible for such a configuration); in other instances only one or a few of the nozzles may be used for jetting. Even if only one jet is jetted at a time, the need for steering is nevertheless reduced, as there is a wider selection of possible nozzles 1252 utilizable for the jetting of that single jet to select from.

It should be noted that apart from affecting missile 20, an activation of the jetting system may have different possible effects on vehicle 1100 in different embodiments of the invention. For example, depending on the shape and weight distribution of vehicle 1100 and on the thrust and location of the high pressure jet, the jetting may have implication on momentum of vehicle 1100, especially if the weight of the vehicle 1100 is relatively small (e.g. a few hundred kilograms and even a few tons) and/or if it does not have support of solid ground (e.g. if vehicle 1100 is a ship or an aircraft). By way of example, jetting from a frontmost portion of vehicle 1100 to the side may cause a greater interference in a course of vehicle 1100 when compared to jetting of a similar jet from a part of the body of vehicle 1100 that is closer to its center of mass.

According to an embodiment of the invention, an effect of the activation of jetting system 1250 on motive behavior (e.g. flight behavior) of vehicle 1100 is unnoticeable to people onboard vehicle 1100 (e.g. driver, crew, passengers). According to an embodiment of the invention, an effect of the activation of jetting system 1250 does not require compensation by any mechanical controller of vehicle 1100.

Regardless of whether a driver or a vehicle system is sufficiently sensitive to sense the effects of the jetting, an alert may be issued by system 1200 to the driver and/or to a system of vehicle 1100. According to an embodiment of the invention, processor 1220 is further configured to issue, following the analysis, an alert to an external vehicle system indicating that a jetting by the jetting system occurred (wherein it is noted that alerting the driver would generally be carried out by a vehicle system connected to system 1200, and not by system 1200 itself).

According to certain embodiments, there are various possible jets that may be jetted by jetting system 1250. For instance, the number and shape of nozzles used for the jetting of each high pressure jet can affect the shape of that jet.

Referring to embodiments of the invention in which vehicle 1100 is an aircraft, it is noted that in many situations, a relative velocity between missile 20 and vehicle 1100 is usually slower than a flight velocity of missile 20 itself, because missile 20 would generally chase the aircraft.

As aforementioned, similar system may be implemented, mutatis mutandis, for reducing damage by missiles to stationary targets such as buildings. It will be clear that the magnitudes exemplified above may be increased substantially in such an implementation. For example, the amount of water or other fluid that may be stored in a building may be practically unlimited (and in some building, especially large ones, water is stored in large quantity for sake of fire fighting), the size and complexity of the jetting system may be increased, larger detectors may be used (possibly with larger relying on external detectors, e.g. at other buildings), and so forth.

Likewise, the types of missiles that the system may be used to protect against in such an implementation may also be extended—as the amounts of water, power, etc. are substantially increased and may be used to protect the building even against much larger (e.g. hundreds of kilograms) and faster missiles. Similar considerations may be applied when implementing the system on a large ground vehicle or naval vehicle, when compared with the airplane mounted version.

Figure 4A:
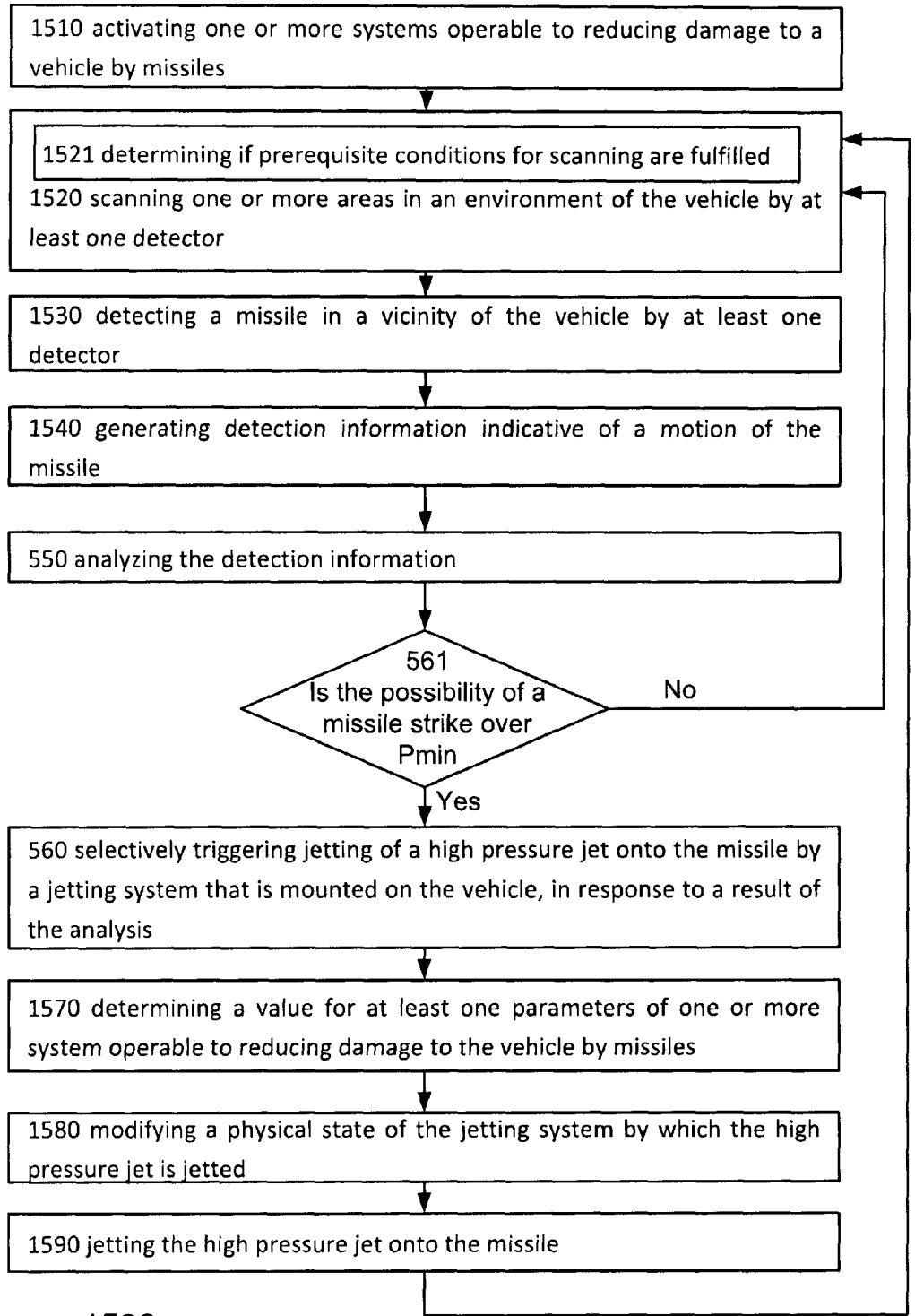
FIG. 4A is a flow chart of a method for reducing damage by missiles, according to an embodiment of the invention.

FIG. 4A illustrates method 1500 for reducing damage by missiles, according to an embodiment of the invention. It is noted that in various embodiments of the invention, method 1500 may be used for reducing damage by a missile to a vehicle of various types, such as various types of aircraft (e.g. airplane, helicopter, UAV, airship, etc.), various types of naval vehicles (e.g. a ship, aircraft carrier, etc.), various types of ground vehicles (e.g. tank, truck, heavy machinery, etc.), and different combinations thereof. In some embodiments of the invention, some of which possibly overlap with the embodiments indicated earlier in this paragraph, may be used for reducing damage by missiles to stationary targets (such as a building, electricity infrastructure, etc.). It should be noted that while some of the subsequent discussion exemplifies the invention in relation to various exemplary types of vehicles, a person who is of skill in the art would readily know that certain modifications are required when implementing the invention for stationary targets.

Referring to the examples set forth in the previous drawings, it should be noted that method 1500 may be carried out by a system such as system 1200. It should be noted that various embodiments of the invention that were discussed in relation to system 1200 would be readily implementable by a person who is skilled in the art also as embodiments of method 1500 (and vice versa), even if not explicitly elaborated.

Method 1500 may start with stage 1510 of activating one or more systems operable to reduce damage by missiles (e.g. by carrying out at least one stage of method 1500). The one or more systems may be operable to reduce damage by missiles to a vehicle, and/or to a stationary target. Especially, the activating may include activating such a system for reducing damage by missiles. Referring to the examples set forth in the previous drawings, stage 1510 may be carried out by a system such as system 1200. Stage 1510 may include, by way of example, initiating such a system, modifying an activity state of such a system, and so forth. A more detailed view of possible implementations of stage 1510 is provided in FIG. 4B.

Method 1500 may include stage 1520 of scanning one or more areas in an environment of the vehicle by at least one detector. It is noted that, according to some embodiments of the invention, at least one of the detectors that participate in the scanning of stage 1520 is mounted on the vehicle, and that in many implementations (though not necessarily so), all of the one or more detectors that participate in the scanning of stage 1520 are mounted on the vehicle. Referring to the example set forth in the previous drawings, stage 1520 of scanning may be carried out by one or more detectors such as detectors 1210.

It should be noted that the scanning of stage 1520 may be carried out in different manners, e.g. depending on the characteristics of the detector that carries out the scanning. For example, the scanning may be done by a scanning beam (e.g. optical, acoustical) which is relatively narrow (when compared to the solid angle subtended by a detection area of the detector in relation to the location of the detector) that scans across the detection area (e.g. as in a LIDAR detector). In other embodiments, the scanning may be carried out by a starring detector that covers a fixed area (e.g. a video camera, and IR camera), and so forth. It should be noted that if more than one detector is implemented, detection areas (also referred to as "coverage areas") of different detectors may—or may not—overlap each other.

It should be noted that not necessarily all (or any) of the one or more detectors actively scan the environment of the vehicle at all times. For example, method 1500 may include activating of a relatively accurate detector (e.g. with very high spatial and/or temporal resolution) in response to the detection results of another detector (e.g. having a larger detection range or lower energetic requirements). For example, method 1500 may include the stage of selectively activating (and/or deactivating) one or more of the detectors that participate in the scanning—e.g. in response to a command issued by a driver, a vehicle system, a remote ground system, and the like, and/or in response to a state of the jetting system, of the detectors, and so forth. According to an embodiment of the invention method 1500 may include issuing an alert to an external vehicle system indicating that a jetting by the jetting system occurred, wherein the issuing is carried out after the analyzing.

According to an embodiment of the invention, the carrying out of the scanning of stage 1520 may depend on the results of stage 1521 of determining if prerequisite conditions for scanning are fulfilled. For example, the determining of stage 1521 may include determining if a condition associated with any of the above exemplified parameters occurred (e.g. a command was received, a jetting system is not functional, etc.). The determining of stage 1521 may also include, by way of example, checking if a velocity of the vehicle is above a minimal velocity threshold (e.g. which characterizes a state of flight when compared to taxi driving, for example in which the vehicle is an airplane), wherein the scanning of stage 1520 is only carried out if the velocity of the vehicle exceeds the aforementioned minimal velocity threshold.

It should be noted that the checking of any of the above identified conditions and states may be carried out directly (e.g. measuring water level in a container of the jetting system) or indirectly (e.g. assessing height by measuring ambient air pressure).

It should be noted that in various implementations of the invention, the scanning may be the longest stage of all the stages of method 1500. In most expected operational conditions, a detection of a missile may last for several seconds and at most under a minute, while the duration of continuous operation of scanning (e.g. during a whole flight) may well exceed an hour or more. Depending on the embodiment of the invention, the scanning may be continued for detection (e.g. in order to detect additional information required for the jetting, and/or to detect other potential missiles), and even after detection of one or more missiles, e.g. in stage 1530. Continuation of the stage of detection may be unnecessary, for example, if the system implementing method 1500 has only sufficient resources to handle a single case of missile detection—or after determining that remaining resources are no longer sufficient for jetting (even if the system may handle more than one jetting).

Method 1500 may include stage 1530 of detecting a missile in a vicinity of the vehicle by at least one detector, wherein according to an embodiment of the invention the detecting of stage 1530 may include detecting by at least one detector that is mounted on the vehicle. Referring to the examples set forth in the previous drawings, stage 1530 may be carried out by any one or more detectors 1210.

It should be noted that the detecting does not necessarily mean that the detector that detected the missile is aware in any way that detection was made. The detector in such a situation may just keep providing information that results from the scanning, but the information that is provided is sufficient to another unit (e.g. a processor such as processor 1220) to determine that an object is detected. Clearly, in other implementations the detector may at least partly analyze the information it generates, and determine when this information requires modification of its state (e.g. by alerting another unit such as an external processor, by modifying the type of information it transmits to such an entity, by modifying its state of scanning, and so forth).

It is further clear to a person who is of skill in the art that the computerized entities may follow predefined rules that are designed to enable proper reaction (e.g. by jetting of water) when a missile is detected. Such rules do not necessarily require that any component of the system would acknowledge detection of a missile, but only that the system as a whole could properly respond to such a scenario.

Optional stage 1540 of method 1500 includes generating detection information indicative of motion of the missile. It should be noted that the detection information generated in stage 1540 may include any combination of a wide range of parameters in different embodiments of the invention. For example, the detection information may include information pertaining to one or more of the following parameters—current location and/or current locations of the missile (especially in relation to the vehicle), future expected location of the missile, relative speed of the missile, size of the missile, and so forth. In case that more than one missile is detected, the detection information may pertain to each detected missile separately.

According to an embodiment of the invention, the generating of stage 1540 may include generating the detection information by a detector mounted on the vehicle (and which detects the missile), but this is not necessarily so. The generating may include generating the detection information by a detector remote from the vehicle (e.g. located on another vehicle or on the ground). According to an embodiment of the invention, stage 1540 may be replaced with a stage of receiving from a system remote from the vehicle the detection information that is indicative of the missile which is detected by a detector remote from the vehicle (e.g. located on another vehicle or on the ground). Referring to the examples set forth in the previous drawings, stage 1540 may be carried out by a detector such as detector 1210.

It should be noted that the detection information that is indicative of the motion of the missile is not necessarily distinguishable—without due processing—from other information that is provided by the detector (e.g. scanning information thereof). While the detector may provide in some embodiments of the invention information that is directly related to the motion of the missile (e.g. estimated location and direction thereof), it is not necessarily so, and in other embodiments such motion parameters may only be gathered by processing of another unit.

Method 1500 may also include stage 1550 of analyzing the detection information. Referring to the examples set forth in the previous drawings, stage 1550 may be carried out by a processor such as processor 1220. The analyzing of the detection information may be a part of an ongoing analysis of information provided regularly by one or more of the at least one detector. The analyzing of the detection information may also be a dedicated analysis indicated as highly relevant (e.g. when an object was detected)—which may exceed the scope of any routine analysis.

The analysis may take different forms in different implementations of the invention. It may include determination of parameter values in response to the detection information analyzed (such as kinetic parameters not previously known, activation parameters for future jetting, and so forth), determining whether thresholds were crossed (e.g. proximity of the missile to the vehicle), and so forth.

According to an embodiment of the invention, the analyzing may further include analyzing the detection information to determine an assessed potential of damage by the missile to an engine of the vehicle (or to any other sensitive component thereof). The determination of the assessed potential of damage may relate to kinetic parameters only (e.g. that enable to assess likelihood of the missile hitting the engine) and may also be responsive to additional parameters (e.g. the potential of damage may depend on the size of the missile, on an operation status of the engine, and so forth).

Method 1500 includes stage 1560 (which may follow stage 1550 in embodiments in which the latter is implemented) of selectively triggering jetting of a high pressure jet onto the missile by a jetting system that is mounted on the vehicle. In embodiments of the invention in which analysis of detection result is implemented, the selective triggering of the jetting may be carried out in response to a result of the analysis.

Referring to the examples set forth in the previous drawings, stage 1560 may be carried out by a processor such as processor 1220. It is noted that while stage 1560 may be implemented by the same one or more processors that carry out stage 1550, this is not necessarily so. According to an embodiment of the invention, the selective triggering includes autonomously triggering the activation of the jetting system without receiving commands from any external system.

It should be noted that the selective triggering may be responsive to result of a determination of whether one or more conditions were fulfilled, which is represented in an example as stage 1561 (which may be part of stage 1560) of determining whether a possibility of damage excess a predetermined threshold. It would be clear to a person who is of skill in the art that various conditions may apply.

It should be noted that the selective triggering may be responsive to other events, and not necessarily to analysis of detection results. For example, according to an embodiment of the invention, the selective triggering may be carried out according to timing information, to location information, to instructions of another system, and so forth. In an exemplary implementation, method 1500 may include recurrent selective triggering of the activation of jetting system for jetting high pressure jets when the vehicle enters a threatened position (e.g. when a tank approaches its firing position and has to at least partly leave a barrier it was hiding behind and expose itself for several seconds in which the firing process takes place).

Stage 1560 may be followed by stage 1590 of jetting the high pressure jet onto the missile. Referring to the examples set forth in the previous drawings, stage 1590 may be carried out by a jetting system such as jetting system 1250—and/or by any component of such a system. It should be noted that the jetting of stage 1590 is conveniently triggered by the triggering of stage 1560.

As would be clear in view of the examples offered in relation to system 1200, in various implementations of the invention—and in various specific scenarios—the jetting of the high pressure jet may take many different forms. For example, in some embodiments of the invention, multiple high pressure jets may be jetted—concurrently or serially, in response to the triggering of stage 1560.

In some embodiments of the invention, stage 1590 may be preceded by stage 1580 of modifying a physical state of the jetting system by which the high pressure jet is jetted. It is noted that in different implementations of the invention, the modifying may be carried out in different ways. Various physical states that may be modified, by way of example, are a direction of one or more nozzles of the jetting system, a pressure in one or more of its containers, a degree to which a faucet is opened, electronic power scheme, and so forth. A person who is of skill in the art would see that method 1500 may also include modifying of a non-physical state of that jetting system—e.g. modifying a logical state of one of its logical components. Such modifications may correspond to physical modifications (e.g. when a faucet is closed, a corresponding flag bit in a logical component may be changed from 1 to 0), but this is not necessarily so.

It should also be noted that while the modifying of the physical (and/or non-physical) states in stage 1580 is illustrated after stage 1550 of analyzing, it is not necessary that stage 1580 will indeed follow stage 1550, and/or be responsive to any of its results.

A more detailed view of possible implementations of stage 1580 is provided in FIG. 4D. FIG. 4D illustrates various possible stages that may be implemented as part of stage 1580, according to various embodiments of the invention. It is noted that while stages 1581-1584 are illustrated as part of stage 1580, those stages are not necessarily carried out concurrently with this stage, and in some embodiments of the invention those stages may be carried out before, after, and/or independently therefrom.

According to an embodiment of the invention that includes determining activation parameters for the jetting system in response to the result of the analysis, method 1500 may include stage 1581 of modifying a shape of an aperture of at least one nozzle in response to the activation parameters, prior to the jetting of the high pressure jet.

According to an embodiment of the invention in which method 500 includes jetting the high pressure jet from a group including multiple nozzles of the jetting system, method 1500 may include stage 1582 of modifying configuration of at least one nozzle of the group in response to the desired jetting direction prior to the jetting of the high pressure jet; wherein method 1500 may further include stage 1583 of modifying the shape of the aperture of at least one nozzle of the group to a different shape than the shape of the aperture of at least one other nozzle of the group, in response to the desired direction or to other jetting parameters such as the narrowing location discussed below.

According to an embodiment of the invention in which method 1500 includes jetting the high pressure jet from a group including multiple nozzles of the jetting system, and determining the activation parameters that include an estimated distance for hitting the missile (e.g. as part of stage 1570 discussed below), method 1500 may further include stage 1584 of controlling configuration of multiple nozzles of the group for controlling a narrowing location of a narrowing of the high pressure jet in response to the estimated distance.

Stage 1580 may follow stage 1570 of determining a value for at least one parameter of one or more systems operable to reduce damage to a vehicle by missiles (e.g. by carrying out at least one stage of method 1500). Especially, stage 1570 may include determining values for at least one jetting system parameter for the jetting system that is used in stage 1590. Referring to the examples set forth in the previous drawings, stage 1570 may be carried out by a processor such as processor 1220. It should be noted that stage 1570 is not necessarily implemented by a processor that carries out the analyzing of stage 1550.

It should also be noted that while the determining of stage 1570 is illustrated after stage 1550 of analyzing, it is not necessary that stage 1570 will indeed follow stage 1550, and/or be responsive to any of it results. However, according to an embodiment of the invention, the determining of stage 1570 may be responsive to one or more results of the analyzing of stage 1550. The modifying of stage 1580 may be carried out in response to at least one result of stage 1570, but this is not necessarily so.

In an example, stage 1570 may include determining a desired jetting direction in response to the result of the analysis, and stage 1580 may include modifying a configuration of at least one nozzle that is used for the jetting of the high pressure jet prior to its jetting, wherein the modifying of the configuration is carried out in response to the desired jetting direction determined in that exemplary implementation of stage 1570.

According to an embodiment of the invention, method 1500 may include (e.g. as a part of stage 1570) determining activation parameters for the jetting system in response to environmental-condition indicative-data that is indicative of at least one physical condition in an environment of the vehicle.

According to an embodiment of the invention, method 1500 may include determining activation parameters for multiple jetting instances of the jetting system.

According to an embodiment of the invention, method 1500 may include (e.g. as part of stage 1570) determining the activation parameters for the multiple jetting instances in response to detection information that is received from the detector and which is indicative of detection of multiple missiles at least partly concurrently.

According to an embodiment of the invention, the jetting may include jetting the high pressure jet onto the missile from at least one nozzle that is located so that a distance between a wing of the vehicle and the nozzle is shorter than a distance of the nozzle from a frontmost part of the vehicle and/or than a distance of the nozzle from a rearmost part of the vehicle.

According to an embodiment of the invention, the jetting may include jetting the high pressure jet onto the missile from at least one nozzle that is located so that a distance between a rearmost part of the vehicle and the nozzle is shorter than 5% of a length of the vehicle which is measured between the frontmost part of the vehicle and a rearmost part of the vehicle.

Various other possible implementations of the jetting stage will be discussed in further detail in relation to FIG. 4C.

Referring to stages 1520, 1530 and 1540, it is noted that in various embodiments of the invention, different types of detectors may carry out any one or more of these stages. For example, according to an embodiment of the invention, stage 1530 of detecting may include detecting the missile by a detector that is a light detection and ranging (LIDAR) detector, which is operable to emit laser pulses and to detect the missile by detection of light reflected from the missile. A few other types that may be used for stages 1520, 1530, and/or 1540 are exemplified in relation to detector 1210 of system 1200, and include for example radar, video sensor, IR detector, and so forth).

FIG. 4B illustrates various possible stages that may be implemented as part of stage 1510 of activating the one or more systems, according to various embodiments of the invention. It is noted that while stages 1511-1514 are illustrated as part of stage 1510, those stages are not necessarily carried out concurrently with this stage, and in some embodiments of the invention those stages may be carried out before, after, and/or independently therefrom.

According to an embodiment of the invention, method 1500 may include stage 1511 of arming one or more systems operable to reducing damage by missiles (e.g. by carrying out at least one stage of method 1500). Especially, stage 1511 may include, according to an embodiment of the invention, arming one or more systems operable to reduce damage to a vehicle by missiles.

Stage 1511 of arming may be carried out, by way of example—during or in preparation for setting-off of the vehicle or its stopping (e.g. anchoring, landing, parking). In some scenarios, it may be part of checklist (e.g. a preflight planning dispatch checklist and/or a pre-landing checklist), and/or may be carried out automatically—e.g. as part of a preflight and/or pre-landing automatic sequence. It should be noted that a disarming of those one or more systems may also be carried out in a similar fashion. It should be noted that a driver (or other external vehicle system) may have an overriding switch, which provides control in activation/arming state of the systems that implement method 1500 or at least some of its stages.

According to an embodiment of the invention, method 1500 may include stage 1512 of (e.g. by carrying out at least one stage of method 1500). Especially, stage 1512 may include testing an operational state of one or more systems operable to reduce damage to a vehicle by missiles. The testing may be self-testing, but this is not necessarily so. It should be noted that different reactions may be implemented for different results of the testing—e.g. issuing an alert, changing a condition of a component, and so forth.

According to an embodiment of the invention, method 1500 may include stage 1513 of gaining control of vehicle resources of one or more other systems of the vehicle. Such resources may be for example electric power, water or other fluid to be jetted, communication, and so forth. The control gained may be of different degrees in different embodiments of the invention, and may include, for example, hydraulically connecting to the fresh water supply of the vehicle in order to fill containers of the jetting system.

According to an embodiment of the invention, method 1500 may include stage 1514 of selectively preventing triggering of the activation of the jetting system in response to received location information that is indicative of a location of the vehicle. This may be used, for example, for selectively preventing triggering of the activation of the jetting system in low altitudes, in airfields, and so forth.

FIG. 4C illustrates various possible stages that may be implemented as part of stage 1590 of jetting the high pressure jet onto the missile, according to various embodiments of the invention. It should be noted that while stages 591-596 are illustrated as part of stage 1590, these stages are not necessarily carried out concurrently with stage 1590, and in some embodiments of the invention these stages may be carried out before, after, and/or independently therefrom.

According to an embodiment of the invention, method 1500 may include stage 1591 of jetting onto the missile the high pressure jet that includes water from at least one jetting system container of water.

According to an embodiment of the invention, stage 1591 may include jetting onto the missile the high pressure jet that includes water from at least one jetting system container of water that is hydraulically connected to a fresh water supply of the vehicle for at least a first period between a setting-off of the vehicle to the triggering of the jetting system, wherein a ratio between water pressure in any of the at least one jetting system container and water pressure of the fresh water supply is less than 1 to 2 at times of such a hydraulic connecting (e.g. if the water pressure of the fresh water supply is about 1 atmosphere, the water pressure in any of the at least one jetting system container according to such an embodiment of the invention).

According to an embodiment of the invention, stage 1591 may include stage 1592 of jetting onto the missile the high pressure jet that includes water from at least one jetting system container of water that is connected to a corresponding high pressure tank that contains high pressured gas (e.g., at a pressure that exceeds 1,000 PSI). According to such an embodiment of the invention, method 1500 may further include stage 1593 of blocking any gas transmission permitting connection between each of the at least one jetting system container and its corresponding high pressure tank during the first period; and stage 1594 of selectively opening at least one gas transmission permitting connection in response to a command (e.g. issued by a processor that carries out stage 1550 of analyzing).

According to an embodiment of the invention, method 1500 may include stage 1595 of blocking any hydraulic connection between each of the at least one jetting system container and a fresh water supply of the vehicle prior to the jetting of the high pressure jet and during the jetting.

According to an embodiment of the invention, stage 1590 may be a part of a stage of concurrently jetting from multiple nozzles of the jetting system multiple high pressure jets, of which at least one jet is jetted onto the missile.

According to an embodiment of the invention, method 1500 may include stage 1596 of administering polymeric material, which is characterized by its usability for modifying surface tension of water, into jetting system container water, wherein stage 1596 is carried out prior to the jetting of the high pressure jet.

According to an embodiment of the invention, method 1500 may include stage 1597 of administering solid particles into jetting system container water, wherein stage 1597 is carried out prior to the jetting of the high pressure jet.

According to an embodiment of the invention, method 1500 may include stage 1598 of jetting onto the missile the high pressure jet that includes water from a body of water in which the vehicle sails, wherein the vehicle is a naval vehicle such as a ship or an at least partly naval vehicle such as a hovercraft. Such a body of water may be relatively still (e.g. sea, ocean, lake) and may be a flowing body of water (e.g. river). The water from the body of water (e.g. pumped) may be contained in jetting system containers before jetting. In other embodiments of the invention, water of the body of water may be pumped directly towards the at least one nozzle used for the jetting of the jet, and not necessarily contained in an intermediary container.

According to an embodiment of the invention, the jetting may include jetting onto the missile the high pressure jet in a jetting direction so that an angle between the jetting direction and a progression direction of the vehicle is between 175° and 185°. In yet other configurations, the jetting may include jetting onto the missile the high pressure jet in a jetting direction so that an angle between the jetting direction (or its opposite direction) and a progression direction of the vehicle may be different—e.g. between 5°-10°, between 10°-20°, between 20°-30°, between 30°-40°, between 40°-50°, between 50°-60°, between 60°-70°, between 70°-80°, and any combination thereof.

According to an embodiment of the invention, the jetting may include jetting onto the missile the high pressure jet in a jetting direction so that an angle between the jetting direction and a progression direction of the vehicle is between 80° and 100°. That angle may also be measured with respect to the longitudinal axis of the vehicle. It is noted that in such a scenario, an angle between the jetting direction and a horizontal axis perpendicular to the longitudinal axis need not be very large (unless protection of specific components such as the tail in an airplane is required). It is noted that measurement of the angle with respect to the longitudinal axis or to the progression direction of the vehicle matters usually only in strong winds, wherein such directions may somewhat deviate one from the other.

According to an embodiment of the invention, method 1500 may include jetting the high pressure jet onto the missile hitting the missile at an angle of less than 40° from an axis perpendicular to a progression direction of the missile at the time of the hit (or even smaller angles such as less than 20° and less than 5°). The angle threshold may be selected to ensure that sufficient energy is transmitted to the missile for it being forced away or diverted away from the vehicle.

According to an embodiment of the invention, method 1500 may include jetting the high pressure jet onto the missile and increasing the kinetic energy of the missile by jetting the high pressure jet onto the missile.

In different implementations of method 1500, one or more high pressure jets may be jetted in different settings and/or physical characteristics. For example, according to an embodiment of the invention, the jetting may include jetting the high pressure jet to an effective distance of at least 3.5 meters from at least one nozzle out of which the high pressure jet is jetted, wherein hit of the missile by the high pressure jet at a distance smaller than the effective distance results in forcing the missile away from an engine of the vehicle. It is clear that other effective distances (e.g. as exemplified above in relation to system 1200) may be used in other implementations of method 1500.

Likewise, according to an embodiment of the invention, the jetting may include jetting the high pressure jet to an effective distance of at least 3.5 meters from at least one nozzle out of which the high pressure jet is jetted, wherein at any distance smaller than the effective distance, water velocity in a core of the high pressure jet is higher than 50 meters per second.

According to an embodiment of the invention, the jetting may include jetting the high pressure jet that consumes between 30 and 150 liters of jetted liquid (e.g. water, or water with additive added thereto). Clearly, in other implementations other amounts of jetted liquid may be used.

According to an embodiment of the invention, the jetting may include jetting of at least one high pressure jet so that any high pressure jet that is jetted by the jetting system during a single activation (e.g. flight of an airplane, journey or part thereof for a ship) of the vehicle is jetted for an effective time of less than 20 milliseconds, wherein the effective duration of a jetting is a duration in which water velocity in a core of the high pressure jet exceeds 50% of the highest water velocity in the core of that jetting.

According to an embodiment of the invention, the jetting may include jetting the high pressure jet wherein an aperture size of any nozzle that is used by the jetting system for the jetting of the high pressure jet is smaller than 4 millimeters. Clearly, in other implementations other sizes may be used, e.g. as exemplified above in relation to system 1200.

Referring to system 1200, it is noted that while system 1200 may be operated as a whole, and designed as a single product, in some implementations a similar system may be an amalgamation or other combination of different systems or sub-systems that may be designed, manufactured and/or installed independently of each other. For example, a prior art detector may be implemented in some embodiments of the invention as the detector that provides detection information—and this detector may be even a detector that pre-exists in the vehicle.

It is therefore made clear that different components and sub-systems of the disclosed system may be manufactured, designed, and/or installed independently of other components, and all are included within the scope of this disclosure.

In an example, processor 1220 may be incorporated into a standalone unit (not illustrated), having some or all of the capabilities discussed in relation to being part of system 1200. Such a standalone unit may include additional components such as casing, power supply, communication jacks, and so forth. Upon installation, for example, it may be connected to a previously unrelated detector, and/or to a jetting system installed in the vehicle. Processor 1220 may also be implemented, for example, on a processor previously installed in vehicle 1220, wherein such implementation may require an additional processing unit connected thereto, and/or software and/or firmware updates made to the vehicle mounted processor.

Likewise, design and manufacture of a jetting system designed to jet high pressure jets onto missiles while the vehicle moves, do not necessarily have to be made with respect to any given processor and/or detector, and such jetting systems (or components thereof) may be designed, manufactured and/or installed onto a vehicle independently of other components of system 1200. Similar systems may be constituted for other components of system 1200, e.g. detector 1210.

Referring to the processor, it is noted that either processor 1220 and/or an equivalent processor of a standalone unit—both of which may be implemented by multiple connected processors—may be implemented as a computer readable medium, having computer readable code embodied thereto for reducing damage by missiles to a vehicle. Such computer readable code may include instructions that, when executed by one or more machines (e.g. processors), cause the one or more machines to perform a method for reducing damage to a vehicle by missiles.

Such a computer readable medium may be implemented in different ways according to different embodiments of the invention. For example, the computer readable medium may be implemented as any one of the following, or combinations thereof—tangible memory, volatile memory, non-volatile memory, magnetic disk, optical disk, flash memory, and so forth.

Thus, according to an embodiment of the invention, a program storage device that is readable by machine is disclosed, wherein the program storage device tangibly embodies a program of instructions executable by the machine to perform a method for reducing damage to a vehicle by missiles including the steps of: (a) receiving detection information that was generated by a detector (possibly mounted on the vehicle) and which is indicative of motion of a missile detected by the detector in a vicinity of the vehicle; (b) analyzing the detection information; and (c) selectively triggering jetting of a high pressure jet onto the missile by a jetting system that is mounted on the vehicle, in response to a result of the analysis.

According to an embodiment of the invention, the instructions embodied in the program storage device for receiving include instructions for receiving the detection information that was generated by the detector that is a light detection and ranging (LIDAR) detector that is operable to emit laser pulses and to detect the missile by detection of light reflected from the missile.

According to an embodiment of the invention, the instructions embodied in the program storage device for analyzing further include instructions for analyzing the detection information to determine an assessed potential of damage by the missile to an engine of the vehicle (or other component thereof).

According to an embodiment of the invention, the program storage device may tangibly embody further instructions executable by the machine for issuing a command for modifying a state of a hydraulic connection between a fresh water supply of the vehicle and at least one jetting system container of water that contains water used for the jetting onto the missile of the high pressure jet and which is hydraulically connected to the fresh water supply of the vehicle for at least a first period between a takeoff of the vehicle to the triggering of the jetting system.

According to an embodiment of the invention, the program storage device may tangibly embody further instructions executable by the machine for selectively issuing a command to open any of at least one gas transmission permitting connection between at least one jetting system container that contains water used for the jetting onto the missile of the high pressure jet and its corresponding high pressure tank.

According to an embodiment of the invention, the program storage device may tangibly embody further instructions executable by the machine for determining a desired jetting direction in response to the result of the analysis, and for issuing a modification command instructing a jetting system component to modify a configuration of at least one nozzle prior to the jetting of the high pressure jet in response to the desired jetting direction.

According to an embodiment of the invention, the program storage device may tangibly embody further instructions executable by the machine for issuing an alert to an external vehicle system indicating that a jetting by the jetting system occurred, wherein the issuing is carried out after the analyzing.

According to an embodiment of the invention, the program storage device may tangibly embody further instructions executable by the machine for selectively preventing triggering of the activation of the jetting system in response to received location information that is indicative of a location of the vehicle.

According to an embodiment of the invention, the program storage device may tangibly embody further instructions executable by the machine for determining activation parameters for the jetting system in response to environmental-condition indicative data that is indicative of at least one physical condition in an environment of the vehicle.

According to an embodiment of the invention, the program storage device may tangibly embody further instructions executable by the machine for determining activation parameters for multiple jetting instances of the jetting system.

According to an embodiment of the invention, the program storage device may tangibly embody further instructions executable by the machine for determining the activation parameters for the multiple jetting instances in response to detection information that is received from the detector and which is indicative of detection of multiple missiles at least partly concurrently.

According to an embodiment of the invention, the instructions embodied in the program storage device for selective triggering may include instructions for autonomously triggering the activation of the jetting system without receiving commands from any external system.

According to an embodiment of the invention, the instructions embodied in the program storage device for selective triggering may include instructions jetting the high pressure jet from a group including multiple nozzles of the jetting system, and for modifying configuration of at least one nozzle of the group in response to the desired jetting direction prior to the jetting of the high pressure jet; wherein the instructions further include instructions for modifying the shape of the aperture of at least one nozzle of the group to a different shape than the shape of the aperture of at least one other nozzle of the group, in response to the desired direction.

According to an embodiment of the invention, the instructions embodied in the program storage device for selective triggering may include instructions jetting the high pressure jet from a group including multiple nozzles of the jetting system, for determining the activation parameters that include an estimated distance for hitting the missile, and for controlling configuration of multiple nozzles of the group for controlling a narrowing location of a narrowing of the high pressure jet in response to the estimated distance.

According to an embodiment of the invention, the instructions embodied in the program storage device for selective triggering may include instructions jetting the high pressure jet onto the missile hitting the missile at an angle of less than 40° from an axis perpendicular to a progression direction of the missile at the time of the hit.

Unless specifically stated otherwise, as apparent from the following discussions, it is appreciated that throughout the specification discussions utilizing terms such as "processing", "calculating", "determining", "generating", "setting", "configuring", "selecting", or the like, refer to the actions and/or processes of a computer that manipulate and/or transform data into other data, said data represented as physical quantities, e.g. such as electronic quantities, and/or said data representing the physical objects. The term "computer" should be expansively construed to cover any kind of electronic device with data processing capabilities, for example, as described in the subject matter of the present application. The computer may enable the teachings of the subject matter of the present invention either by being specially constructed for the desired purposes or by being a general purpose computer configured for the desired purpose by a computer program stored in a computer readable storage medium.

Figure 5:
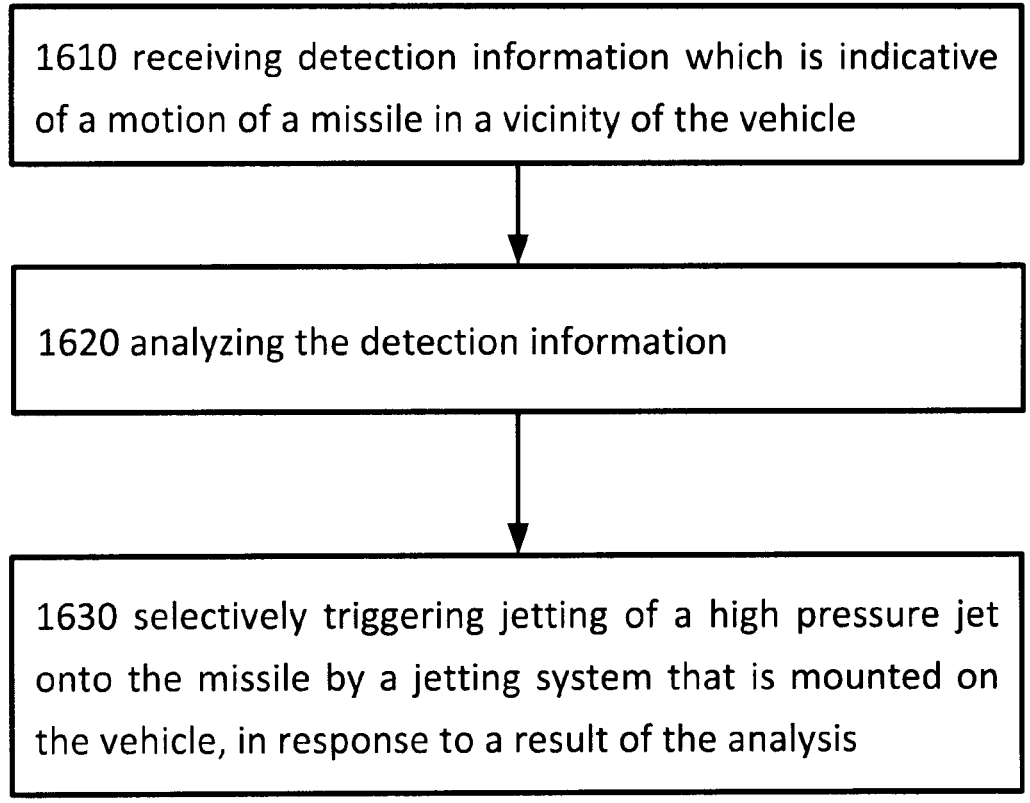
FIG. 5 is a flow chart of a method for reducing damage by missiles, according to an embodiment of the invention.

FIG. 5 illustrates method 1600 for reducing damage by missiles, according to an embodiment of the invention. Method 1600 may be a method for reducing damage to a vehicle by missiles, but this is not necessarily so—and the vehicle referred to may be replaced with a stationary target.

Referring to the examples set forth in the previous drawings, method 1600 may be carried out by a processor such as processor 1220. However, it should be noted that method 1600 may also be carried out by any group of one or more processors that do not necessarily form a part of a system such as system 1200. It would however be clear to a person who is of skill in the art that some implementations and variations previously disclosed in relation to method 1500 and/or to system 1200 (and especially to processor 1220) may be implemented—mutatis mutandis—in method 1600, even if not explicitly elaborated.

Method 1600 may include stage 1610 of receiving detection information which is indicative of motion of a missile detected in a vicinity of the vehicle. According to an embodiment of the invention, the receiving of stage 1610 may include receiving the detection information which was generated by a detector mounted on the vehicle (and which detected the missile), but this is not necessarily so. The receiving may include receiving of detection information indicative of the missile which is detected by a detector remote from the vehicle (e.g. located on another vehicle or on the ground).

Method 1600 may include stage 1620 of analyzing the detection information.

Stage 1630 of method 1600 (which may follow stage 1620, in embodiments of the invention in which it is implemented) includes selectively triggering jetting of a high pressure jet onto the missile by a jetting system that is mounted on the vehicle. In embodiments of the invention in which stage 1620 is implemented, the selective triggering of stage 1630 may be carried out in response to a result of the analysis.

According to an embodiment of the invention, stage 1610 of receiving may include receiving the detection information that was generated by the detector that is a light detection and ranging (LIDAR) detector that is operable to emit laser pulses and to detect the missile by detection of light reflected from the missile.

According to an embodiment of the invention, stage 1620 of analyzing may include analyzing the detection information to determine an assessed potential of damage by the missile to an engine of the vehicle (or other component thereof).

According to an embodiment of the invention, method 1600 may further include issuing a command for modifying a state of a hydraulic connection between a fresh water supply of the vehicle and at least one jetting system container of water that contains water used for the jetting onto the missile of the high pressure jet and which is hydraulically connected to the fresh water supply of the vehicle for at least a first period between a takeoff of the vehicle to the triggering of the jetting system.

According to an embodiment of the invention, method 1600 may further include selectively issuing a command to open any of at least one gas transmission permitting connection between at least one jetting system container that contains water used for the jetting onto the missile of the high pressure jet and its corresponding high pressure tank.

According to an embodiment of the invention, method 1600 may further include determining a desired jetting direction in response to the result of the analysis, and issuing a modification command instructing a jetting system component to modify a configuration of at least one nozzle prior to the jetting of the high pressure jet in response to the desired jetting direction.

According to an embodiment of the invention, method 1600 may further include issuing an alert to an external vehicle system indicating that a jetting by the jetting system occurred, wherein the issuing is carried out after the analyzing.

According to an embodiment of the invention, method 1600 may further include selectively preventing triggering of the activation of the jetting system in response to received location information that is indicative of a location of the vehicle.

According to an embodiment of the invention, method 1600 may further include determining activation parameters for the jetting system in response to environmental-condition indicative-data that is indicative of at least one physical condition in an environment of the vehicle.

According to an embodiment of the invention, method 1600 may further include determining activation parameters for multiple jetting instances of the jetting system.

According to an embodiment of the invention, method 1600 may further include determining the activation parameters for the multiple jetting instances in response to detection information that is received from the detector and which is indicative of detection of multiple missiles at least partly concurrently.

According to an embodiment of the invention, the selective triggering may include autonomously triggering the activation of the jetting system without receiving commands from any external system (e.g. intervention of an external system or of a driver intermediated by such system).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It will be appreciated that the embodiments described above are cited by way of example, and various features thereof and combinations of these features can be varied and modified.

While various embodiments have been shown and described, it will be understood that there is no intent to limit the invention by such disclosure, but rather, it is intended to cover all modifications and alternate constructions falling within the scope of the invention, as defined in the appended claims.

What is claimed is:

1. A system for reducing damage by missiles to a vehicle, the system comprising:
   a detector operable to detect a missile and to generate detection information indicative of a motion of the missile;
   a processor, configured to analyze the detection information and to selectively trigger activation of a jetting system that is mounted on the vehicle in response to a result of the analysis; and
   the jetting system, comprising at least one jetting system container that is coupled to a corresponding high pressure tank that contains high pressured gas, and operable to jet a high pressure jet onto the missile; wherein any gas transmission permitting coupling between each of the at least one jetting system container and its corresponding high pressure tank is blocked during a first period between a takeoff of the vehicle to the triggering of the jetting system and is selectively opened in response to a command issued by the processor.

2. The system according to claim 1, wherein the detector is operable to detect the missile in a vicinity of the vehicle.

3. The system according to claim 1, wherein the detector is mounted on the vehicle.

4. The system according to claim 1, wherein the detector is an optical detector, operable to detect the missile by detection of light reflected from the missile.

5. The system according to claim 4, wherein the detector is a light detection and ranging (LIDAR) detector, operable to emit laser pulses and to detect the missile by detection of light reflected from the missile.

6. The system according to claim 1, wherein the processor is further configured to analyze the detection information to determine an assessed potential of damage by the missile to an engine of the vehicle, and to selectively trigger the activation of the jetting system in response to a result of the analysis.

7. The system according to claim 1, wherein the vehicle is an aircraft.

8. The system according to claim 7, wherein a distance between a wing of the aircraft and a nozzle of the jetting system used for the jetting of the high pressure jet is shorter than a distance of the nozzle from a rearmost part of the aircraft, wherein the nozzle is located backwards of the wing.

9. The system according to claim 1, wherein the at least one jetting system container comprises water, and the jetting system is operable to jet onto the missile the high pressure jet that comprises water from the at least one jetting system container.

10. The system according to claim 9, wherein at least one component of the jetting system is operable to administer polymeric material, for modifying surface tension of water, into jetting system container water before jetting the high pressure jet that comprises the water from the at least one jetting system container.

11. The system according to claim 9, wherein at least one component of the jetting system is operable to administer solid particles into jetting system container water before jetting the high pressure jet that comprises the water from the at least one jetting system container.

12. The system according to claim 7, wherein the at least one jetting system container of water is hydraulically coupled to a fresh water supply of the vehicle for at least a first period between a takeoff of the aircraft to the triggering of the jetting system, wherein a ratio between water pressure in any of the at least one jetting system container and water pressure of the fresh water supply is less than 1 to 2 at times of such a hydraulic coupling.

13. The system according to claim 12, wherein the high pressure tank contains high pressured gas at a pressure that exceeds 1,000 pounds per square inch (PSI).

14. The system according to claim 1, wherein an angle between a jetting direction in which the jetting system is operable to jet the high pressure jet and a progression direction of the vehicle is from 175° to 185°.

15. The system according to claim 1, wherein an angle between a jetting direction in which the jetting system is operable to jet the high pressure jet and a progression direction of the vehicle is from 80° to 100°.

16. The system according to claim 1, wherein the processor is further configured to issue, following the analysis, an alert to an external vehicle system indicating that a jetting by the jetting system occurred.

17. The system according to claim 1, wherein the processor is further configured to receive location information indicative of a location of the vehicle and to selectively prevent triggering of the activation of the jetting system in response to the location information.

18. The system according to claim 1, wherein the processor is further configured to receive from an external system of the vehicle environmental-condition-indicative-data that is indicative of at least one physical condition in an environment of the vehicle, and to determine activation parameters for the jetting system in response to the environmental-condition-indicative-data.

19. The system according to claim 1, wherein the processor is further configured to determine activation parameters for multiple jetting instances of the jetting system.

20. The system according to claim 1, wherein the processor is configured to autonomously trigger the activation of the jetting system without receiving commands from any external system.

21. The system according to claim 1, wherein the processor is further configured to determine a desired jetting direction in response to the result of the analysis, wherein a configuration of at least one nozzle is modified prior to the jetting of the high pressure jet in response to the desired jetting direction.

22. The system according to claim 1, wherein the processor is further configured to determine activation parameters for the jetting system in response to the result of the analysis, wherein a shape of an aperture of at least one nozzle is modified prior to the jetting of the high pressure jet in response to the activation parameters.

23. The system according to claim 21, wherein the jetting system is operable to jet the high pressure jet from a group comprising multiple nozzles, wherein configuration of at least one nozzle of the group is modified prior to the jetting of the high pressure jet in response to the desired jetting direction, wherein the shape of the aperture of at least one nozzle of the group is modified to a different shape than the shape of the aperture of at least one other nozzle of the group, in response to the desired direction.

24. The system according to claim 22, wherein the jetting system is operable to jet the high pressure jet from a group comprising multiple nozzles, wherein the processor is configured to determine the activation parameters that comprise an estimated distance for hitting the missile, wherein the jetting system is operable to control the configuration of multiple nozzles of the group for controlling a narrowing location of a narrowing of the high pressure jet in response to the estimated distance.

25. The system according to claim 1, wherein the jetting system is operable to jet the high pressure jet onto the missile hitting the missile at an angle of less than 40° from an axis perpendicular to a progression direction of the missile at the time of the hit.

26. The system according to claim 1, wherein the jetting system is operable to increase the kinetic energy of the missile by jetting the high pressure jet onto the missile.

27. The system according to claim 1, wherein the vehicle is a ground vehicle.

28. The system according to claim 1, wherein the vehicle is a ship.

29. A method for reducing damage to a vehicle by missiles, the method comprising:
   detecting a missile by a detector that is mounted on the vehicle;
   generating detection information indicative of motion of the missile; analyzing the detection information; and
   selectively triggering jetting of a high pressure jet onto the missile by a jetting system that is mounted on the vehicle, in response to a result of the analysis, wherein the high pressure jet comprises water from at least one jetting system container of water that is coupled to a corresponding high pressure tank that contains high pressured gas, and wherein any gas transmission permitting coupling between each of the at least one jetting system container and its corresponding high pressure tank is blocked during a first period between a takeoff of the vehicle to the triggering of the jetting system and is selectively opened in response to a command issued by a processor.

30. The method according to claim 29, wherein the detecting comprises detecting the missile by the detector in a vicinity of the vehicle.

31. The method according to claim 29, wherein the analyzing further comprises analyzing the detection information to determine an assessed potential of damage by the missile to an engine of the vehicle.

32. The method according to claim 29, wherein the vehicle is an aircraft.

33. The method according to claim 32, comprising jetting of the high pressure jet onto the missile from at least one nozzle that is located so that a distance between a wing of the aircraft and the nozzle is shorter than a distance of the nozzle from a rearmost part of the aircraft.

34. The method according to claim 29, further comprising administering a polymeric material, for modifying surface tension of water, into the at least one jetting system container of water prior to the jetting of the high pressure jet.

35. The method according to claim 29, further comprising administering solid particles into the at least one jetting system container of water prior to the jetting of the high pressure jet.

36. The method according to claim 29, comprising jetting onto the missile the high pressure jet that comprises water from at least one jetting system container of water that is hydraulically coupled to a fresh water supply of the vehicle for at least a first period between a setting-off of the vehicle to the triggering of the jetting system, wherein a ratio between water pressure in any of the at least one jetting system container and water pressure of the fresh water supply is less than 1 to 2 at times of such a hydraulic coupling.

37. The method according to any claim 36, wherein the high pressure tank contains high pressured gas at a pressure that exceeds 1,000 pounds per square inch (PSI).

38. The method according to claim 29, further comprising determining activation parameters for multiple jetting instances of the jetting system.

39. The method according to claim 29, further comprising determining activation parameters for the jetting system in response to the result of the analysis, and modifying a shape of an aperture of at least one nozzle in response to the activation parameters, prior to the jetting of the high pressure jet.

40. The method according to claim 37, comprising jetting the high pressure jet from a group comprising multiple nozzles of the jetting system, and modifying configuration of at least one nozzle of the group in response to the desired jetting direction prior to the jetting of the high pressure jet; wherein the method comprises modifying the shape of the aperture of at least one nozzle of the group to a different shape than the shape of the aperture of at least one other nozzle of the group, in response to the desired direction.

41. The method according to claim 38, comprising jetting the high pressure jet from a group comprising multiple nozzles of the jetting system, determining the activation parameters that comprise an estimated distance for hitting the missile, and controlling configuration of multiple nozzles of the group for controlling a narrowing location of a narrowing of the high pressure jet in response to the estimated distance.

42. The method according to claim 29, comprising jetting the high pressure jet onto the missile hitting the missile at an angle of less than 40° from an axis perpendicular to a progression direction of the missile at the time of the hit.

43. The method according to claim 29, comprising jetting the high pressure jet onto the missile and increasing the kinetic energy of the missile by jetting the high pressure jet onto the missile.

44. A system for reducing damage by missiles to a stationary target, the system comprising:
- a detector operable to detect a missile and to generate detection information indicative of a motion of the missile;
- a processor, configured to analyze the detection information and to selectively trigger activation of a jetting system that is mounted on the stationary target in response to a result of the analysis; and
- the jetting system, comprising at least one jetting system container that is coupled to a corresponding high pressure tank that contains high pressured gas, and operable to jet a high pressure jet onto the missile; wherein any gas transmission permitting coupling between each of the at least one jetting system container and its corresponding high pressure tank is blocked during a first period and is selectively opened in response to a command issued by the processor.

45. The system according to claim 44, wherein the detector is an external detector mounted elsewhere than on the stationary target.

46. The system according to claim 44, wherein the detector is an optical detector, operable to detect the missile by detection of light reflected from the missile.

47. The system according to claim 44, wherein the at least one jetting system container comprises water, and the jetting system is operable to jet onto the missile the high pressure jet that comprises water from the at least one jetting system container.

48. The system according to claim 44, wherein the processor is further configured to determine activation parameters for multiple jetting instances of the jetting system.

49. The system according to claim 44, wherein the processor is configured to autonomously trigger the activation of the jetting system without receiving commands from any external system.

50. The system according to claim 44, wherein the processor is further configured to determine a desired jetting direction in response to the result of the analysis, wherein a configuration of at least one nozzle is modified prior to the jetting of the high pressure jet in response to the desired jetting direction.

51. The system according to claim 44, wherein the processor is further configured to determine activation parameters for the jetting system in response to the result of the analysis, wherein a shape of an aperture of at least one nozzle is modified prior to the jetting of the high pressure jet in response to the activation parameters.

52. The system according to claim 44, wherein the jetting system is operable to increase the kinetic energy of the missile by jetting the high pressure jet onto the missile.

53. A method for reducing damage to a stationary target by missiles, the method comprising:
- detecting a missile in a vicinity of the stationary target;
- generating detection information indicative of motion of the missile; analyzing the detection information; and
- selectively triggering jetting of a high pressure jet onto the missile by a jetting system that is mounted on the stationary target, in response to a result of the analysis, wherein the high pressure jet comprises water from at least one jetting system container of water that is coupled to a corresponding high pressure tank that contains high pressured gas, and wherein any gas transmission permitting coupling between each of the at least one jetting system container and its corresponding high pressure tank is blocked during a first period and is selectively opened in response to a command issued by a processor.

54. The method according to claim 53, further comprising administering a polymeric material, for modifying surface tension of water, into the at least one jetting system container of water prior to the jetting of the high pressure jet.

55. The method according to claim 53, further comprising administering solid particles into the at least one jetting system container of water prior to the jetting of the high pressure jet.

56. The method according to claim 53, further comprising determining activation parameters for multiple jetting instances of the jetting system.

57. The method according to claim 53, further comprising determining activation parameters for the jetting system in response to the result of the analysis, and modifying a shape of an aperture of at least one nozzle in response to the activation parameters, prior to the jetting of the high pressure jet.

58. The method according to claim 53, comprising jetting the high pressure jet from a group comprising multiple nozzles of the jetting system, and modifying configuration of at least one nozzle of the group in response to the desired jetting direction prior to the jetting of the high pressure jet; wherein the method comprises modifying the shape of the aperture of at least one nozzle of the group to a different shape than the shape of the aperture of at least one other nozzle of the group, in response to the desired direction.

59. The method according to claim 53, comprising jetting the high pressure jet from a group comprising multiple nozzles of the jetting system, determining the activation parameters that comprise an estimated distance for hitting the missile, and controlling configuration of multiple nozzles of the group for controlling a narrowing location of a narrowing of the high pressure jet in response to the estimated distance.

60. The method according to claim 53, comprising jetting the high pressure jet onto the missile and increasing the kinetic energy of the missile by jetting the high pressure jet onto the missile.

\* \* \* \* \*